United States Patent
Jaber et al.

(10) Patent No.: US 10,792,620 B2
(45) Date of Patent: Oct. 6, 2020

(54) GRAFTED ULTRA HIGH MOLECULAR WEIGHT POLYETHYLENE MICROPOROUS MEMBRANES

(71) Applicant: ENTEGRIS, INC., Billerica, MA (US)

(72) Inventors: Jad Ali Jaber, Billerica, MA (US); Alketa Gjoka, Billerica, MA (US)

(73) Assignee: ENTEGRIS, INC., Billerica, MA (US)

( * ) Notice: Subject to any disclaimer, the term of this patent is extended or adjusted under 35 U.S.C. 154(b) by 449 days.

(21) Appl. No.: 15/527,094

(22) PCT Filed: Nov. 19, 2015

(86) PCT No.: PCT/US2015/061591
§ 371 (c)(1),
(2) Date: May 16, 2017

(87) PCT Pub. No.: WO2016/081729
PCT Pub. Date: May 26, 2016

(65) Prior Publication Data
US 2018/0290109 A1 Oct. 11, 2018

Related U.S. Application Data

(60) Provisional application No. 62/082,573, filed on Nov. 20, 2014, provisional application No. 62/082,576, (Continued)

(51) Int. Cl.
B01D 71/26 (2006.01)
B01D 67/00 (2006.01)
(Continued)

(52) U.S. Cl.
CPC ......... B01D 71/26 (2013.01); B01D 67/0093 (2013.01); B01D 69/02 (2013.01);
(Continued)

(58) Field of Classification Search
None
See application file for complete search history.

(56) References Cited

U.S. PATENT DOCUMENTS

| 3,253,057 A | 5/1966 | Landler |
| 4,151,225 A | 4/1979 | Buning |

(Continued)

FOREIGN PATENT DOCUMENTS

| CN | 1395498 A | 2/2003 |
| CN | 1604921 A | 4/2005 |

(Continued)

OTHER PUBLICATIONS

Ghahremani et al., "Measuring surface tension of binary mixtures of water + alcohols from the diffraction pattern of surface ripples," Der Chemica Sinica, vol. 2, Issue 6, 2011, pp. 212-221.
(Continued)

Primary Examiner — Krishnan S Menon
(74) Attorney, Agent, or Firm — Entegris, Inc.

(57) ABSTRACT

Grafted, asymmetric, porous, ultra high molecular weight polyethylene membranes having a bubble point between about 5.38 bar (78 psi) and 11.03 bar (160 psi) are disclosed. Monomers are grafted to the porous polymeric membrane surfaces, the monomers having one or more of neutral groups or ion exchange groups grafted to one or more surfaces of the membrane. A combination of two photoinitiators can be used to graft the monomers to the asymmetric, porous, ultra high molecular weight membrane resulting in grafted microporous membranes that have water flow rates that are at least 50% of the water flow rate of an ungrafted, asymmetric, porous ultra high molecular weight polyethylene membrane. The grafted membrane also wets in water.

20 Claims, 14 Drawing Sheets

Related U.S. Application Data filed on Nov. 20, 2014, provisional application No. 62/082,570, filed on Nov. 20, 2014.

(51) Int. Cl.
*B01D 69/02* (2006.01)
*B01D 71/78* (2006.01)

(52) U.S. Cl.
CPC .......... *B01D 71/78* (2013.01); *B01D 2323/02* (2013.01); *B01D 2323/30* (2013.01); *B01D 2323/345* (2013.01); *B01D 2323/36* (2013.01); *B01D 2323/385* (2013.01); *B01D 2325/022* (2013.01); *B01D 2325/14* (2013.01); *B01D 2325/16* (2013.01); *B01D 2325/36* (2013.01)

(56) References Cited

U.S. PATENT DOCUMENTS

| | | | |
|---|---|---|---|
| 4,278,777 | A | 7/1981 | Jakabhazy et al. |
| 4,311,573 | A | 1/1982 | Mayhan et al. |
| 4,618,533 | A | 10/1986 | Steuck |
| 5,128,041 | A | 7/1992 | Degen et al. |
| 5,629,084 | A | 5/1997 | Moya |
| 6,179,132 | B1 | 1/2001 | Moya |
| 6,379,551 | B1 | 4/2002 | Lee et al. |
| 7,306,729 | B2 | 12/2007 | Bacino et al. |
| 2003/0077435 | A1* | 4/2003 | Charkoudian ..... B01D 67/0088 428/304.4 |
| 2007/0119774 | A1 | 5/2007 | Yen et al. |
| 2009/0234032 | A1 | 9/2009 | Kimishima |
| 2011/0094960 | A1 | 4/2011 | Zhou et al. |
| 2015/0136698 | A1* | 5/2015 | Bothof .................. B01J 20/321 210/651 |
| 2018/0015424 | A1* | 1/2018 | Exley .................. B01D 67/009 |

FOREIGN PATENT DOCUMENTS

| | | |
|---|---|---|
| CN | 1735636 A | 2/2006 |
| CN | 102504320 A | 6/2012 |
| EP | 1 779 914 A1 | 5/2007 |
| EP | 1779914 A | 5/2007 |
| EP | 1 961 784 A1 | 8/2008 |
| JP | H01-119304 A | 5/1989 |
| JP | H09-512857 A | 12/1997 |
| JP | 2007-519522 A | 7/2007 |
| JP | 2010-059395 A | 3/2010 |
| JP | 2011-508065 A | 3/2011 |
| JP | 2011-526830 A | 10/2011 |
| JP | 2014176346 A | 9/2014 |
| JP | 2015203048 A | 11/2015 |
| KR | 10-2009-0009216 A | 1/2009 |
| WO | 2007/126967 A2 | 11/2007 |
| WO | 2008/043507 A1 | 4/2008 |
| WO | 2007/069714 A1 | 5/2009 |
| WO | 2009/086347 A1 | 7/2009 |
| WO | 2010/092938 A1 | 8/2010 |
| WO | 2010/117845 A2 | 10/2010 |
| WO | 2010137974 A1 | 12/2010 |
| WO | 2012/154790 A2 | 11/2012 |
| WO | 2016/081729 A1 | 5/2016 |

OTHER PUBLICATIONS

Bhattacharya et al., Polymer Grafting and Crosslinking, Chapter 2, "Basic Features and Techniques", John Wiley & Sons, Inc., Hoboken, New Jersey, 2009, pp. 7-58.

Costello et al., "Surface Modification of Poly(tetrafluoroethylene) with Benzoin Dianion", Macromolecules, vol. 17, No. 12, 1984, pp. 2940-2942.

Misra et al., "Grafting onto Wool. XX. Graft Copolymerization of Vinyl Monomers by Use of Redox Initiators. Comparison of Monomer Reactivities", Journal of Applied Polymer Science, vol. 27, 1982, pp. 1321-1326.

Desai et al., "Surface Modification of Polyethylene", Adv Polym Sci, 169, 2004, pp. 231-293.

Iqbal et al., "Polyacetylene Formed by the Benzoin Dianion Reduction of Poly(tetrafluoroethylene)", Macromolecules, vol. 19, No. 12, 1986, pp. 2992-2996.

Bauer et al., "Anion-Exchange Membranes with Improved Alkaline Stability", Desalination, 79, 1990, pp. 125-144.

Chen et al., "Degradation of Imidazolium- and Quaternary Ammonium-Functionalized Poly(fluorenyl ether ketone sulfone) Anion Exchange Membranes", ACS Appl. Mater. Interfaces, 4 (11), 2012, pp. 5775-5781.

Huang et al., "Composite Anion Exchange Membrane for Alkaline Direct Methanol Fuel Cell: Structural and Electrochemical Characterization", Journal of Applied Polymer Science, vol. 100, (2006) pp. 2248-2251.

Dawson, J., "The Effects of Gamma Radiation Sterilization on Ultra High Molecular Weight Polyethylene", Ageing Studies and Lifetime Extension of Materials, Edited by Mallinson, Kluwer Academic/Plenum Publishers, 2001, p. 155.

Database WPI Week 201262 Thomson Scientific, London, GB; AN 2012-J53674 XP002753843.

Deng J et al., "Developments and new applications of UV-induced surface graft polymerizations," Progress in Polymer Science, Pergamon Press, Oxford, GB, vol. 34, No. 2, pp. 156-193 (Feb. 1, 2009).

He, D., and Ulbricht, M., "Surface-selective photo-grafting on porous polymer membranes via a synergist immobilization method," Journal of Materials Chemistry, vol. 16, pp. 1860-1868 (Mar. 31, 2006).

* cited by examiner

GRAFTED ULTRA HIGH MOLECULAR WEIGHT POLYETHYLENE MICROPOROUS MEMBRANES

RELATED APPLICATIONS

This application is filed under the provisions of 35 U.S.C. §371 claiming priority of International Patent Application No. PCT/US2015/061591, filed on Nov. 19, 2015, which further claims the benefit of U.S. Provisional Application Nos. 62/082,570, filed on Nov. 20, 2014, 62/082,573, filed on Nov. 20, 2014, and 62/082,576, filed on Nov. 20, 2014. The entire teachings of the above applications are incorporated herein by reference.

BACKGROUND OF THE INVENTION

The removal of ions from solutions is important in many industries, such as the microelectronics industry, where ionic contaminants and particles in very small concentrations can adversely affect the performance and fabrication of microprocessors and memory devices. The ability to prepare positive and negative photoresists with low levels of metal ion contaminants, or the ability to deliver isopropyl alcohol used in Maragoni drying for wafer cleaning with low part per billion or part per trillion levels of metal ion contaminants is highly desirable and are just two examples of the needs for contamination control in semiconductor manufacturing. Anionic or negatively charged impurities like chloride ions can also be present in liquids used in semiconductor processing and there is also a need to remove them from liquids. Colloidal particles, which can be positively or negatively charged depending on the colloid chemistry and solution pH, can also contaminate process liquids and need to be removed.

Many microporous membranes are made from chemically inert, low surface energy polymers like ultrahigh molecular weight polyethylene, polytetrafluoroethylene, and the like. As the pore size of these membranes continues to shrink, the ability to wet these membranes with liquids prior to use, or to prevent dewetting during use, is important in reducing semiconductor tool downtime. Tool downtime can occur because prewetting liquids need to be flushed from filter membranes or because dewet and gas locked filter membranes used in gas containing chemistries need to be rewet or replaced. There is a continuing need for microporous membranes with modified surface energies that can facilitate wetting of the membrane and that can be used for the removal of charged contaminants from liquids.

Grafting of molecules on polymeric supports can be accomplished by several means that are known in the art such as, for example, electron beam treatment, plasma grafting, and gamma radiation grafting. One drawback with these methods is that an ionizing irradiation source is used, which can lead to changes in the polymeric structure and eventual degradation of the membrane. For example, when polymers are exposed to gamma radiation, free radicals are produced. It has been shown that in the case of semi-crystalline polymers, such as ultra high molecular weight polyethylene (UHMWPE), the radicals that are produced can contribute to oxidative chain scission, which is a dominant degradation process. The degradation can even continue post-irradiation as reactive species formed during irradiation can migrate towards the amorphous polymeric regions and react with oxygen to cause further damage. See Ageing Studies and Lifetime Extension of Materials. Edited by Mallinson, Kluwer Academic IPlenum Publishers, 2001 page 155. This is undesirable as it can severely impact the strength and shelf life of a polymeric substrate.

Another drawback with ionizing radiation energy sources is that a long time can be required to graft molecules on the polymer substrate surface. For example, U.S. Pat. No. 6,379,551 (Lee et al.) describes a process for grafting on porous polyethylene support material using gamma radiation at an approximate dose of 6,000 R/hour for 60 hours.

SUMMARY OF THE INVENTION

Versions of the invention include a grafted, asymmetric, porous ultra high molecular weight polyethylene membrane having a bubble point between about 78 psi to 160 psi when an ethoxy-nonafluorobutane bubble point test is performed. The membrane can have one or more neutral or ion exchange groups grafted to one or more surfaces of the membrane. The membrane can have a water flow rate that is at least 50%, or in some instances about 50%, of the water flow rate of ungrafted, asymmetric, porous ultra high molecular weight polyethylene membrane having a bubble point between about 78 psi and about 160 psi when challenged with ethoxy-nonafluorobutane. The membrane can have a water flow rate that is at least 75%, or in some instances about 75%, of the water flow rate of ungrafted, asymmetric, porous ultra high molecular weight polyethylene membrane having a bubble point between about 78 psi and about 160 psi when challenged with ethoxy-nonafluorobutane. In some instances, the membrane can have a water flow rate that is about 50% of the water flow rate of the ungrafted, asymmetric, porous ultra high molecular weight polyethylene membrane having a bubble point between about 78 psi and about 160 psi when wetted with ethoxy-nonafluorobutane. The membrane can wet in water in 10 seconds or less. In some instances, the grafted membrane can have a bubble point between about 100 psi and 160 psi, or between about 100 psi and about 140 psi, or between about 120 psi and about 160 psi, or between about 120 psi and 140 psi when challenged with ethoxy-nonafluorobutane.

In some versions of the grafted polymeric microporous membrane, the grafted polymeric microporous membranes can have neutral groups or ion exchanged groups grafted to one or more surfaces. In some instances, the neutral groups or ion exchange groups are derived from one or more of N-(hydroxymethyl)acrylamide, 2-hydroxyethylacrylate, (3-acrylamidopropyl)trimethylammonium chloride, and (vinylbenzyl)trimethylammonium chloride.

In some versions, a cationic monomer is one or more of 2-(dimethylamino)ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, [2-(methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-Aminopropyl)-methacrylamide hydrochloride, diallyldimethylammonium chloride, allylamine hydrochloride, vinyl imidazolium hydrochloride, vinyl pyridinium hydrochloride and vinyl benzyl trimethyl ammonium chloride.

In some versions, an anionic monomer is one or more of 2-ethylacrylic acid, acrylic acid, 2-carboxyethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3-methacrylamido phenyl boronic acid, vinyl sulfonic acid and vinyl phosphonic acid.

In some versions, grafted, asymmetric, porous, ultra high molecular weight polyethylene membrane can wet in water in 5 seconds or less.

Typically, the membrane radical generating reagents used in versions of the invention can include type I and type II photoinitiators. Various persulfate salts, such as sodium persulfate and potassium persulfate, are a non-limiting examples of type I photoinitiators that can be used. Without wishing to be bound by theory, the type I photoinitiator undergoes a unimolecular bond cleavage upon irradiation to yield free radicals. Benzophenone is a non-limiting example of type II photoinitiator that can be used. Without wishing to be bound by theory, the type II photoinitiator undergoes a bimolecular reaction such that the excited state of the photoinitiator interacts with a second molecule (for example UHMWPE chain) to generate free radicals.

In some versions, the grafted, asymmetric, porous, ultra high molecular weight polyethylene membrane has a surface tension between 47 dyne/cm and 69 dynes/cm. In other versions, the grafted, asymmetric, porous, ultra high molecular weight polyethylene membrane has a surface tension between 47 dyne/cm and 59 dynes/cm. In yet other versions, the grafted, asymmetric, porous, ultra high molecular weight polyethylene membrane has a surface tension between 70 dyne/cm and 72 dynes/cm. In some versions, the grafted, asymmetric, porous, ultra high molecular weight polyethylene membrane has a surface tension that is between about 60% to 75% higher than the surface tension of an ungrafted, asymmetric, porous ultra high molecular weight polyethylene membrane having a bubble point between about 78 psi and about 160 psi when determined by an ethoxy-nonafluorobutane bubble point test.

In some versions, the grafted, asymmetric, porous, ultra high molecular weight polyethylene membrane has a dye binding capacity between about 3 µg/cm$^2$ and 40 µg/cm$^2$, or between about 7 µg/cm$^2$ and 15 µg/cm$^2$.

Described herein is a grafted, asymmetric, porous, ultra high molecular weight polyethylene membrane having a bubble point between about 78 psi and 160 psi when determined by an ethoxy-nonafluorobutane bubble point test. The grafted membrane can have one or more neutral groups or ion exchange groups grafted to one or more surfaces of the membrane. The membrane can have a water flow rate that is at least 50% of the water flow rate of an ungrafted, asymmetric, porous ultra high molecular weight polyethylene membrane having a bubble point between about 78 psi and about 160 psi when determined by an ethoxy-nonafluorobutane bubble point test. The grafted membrane can wet in water in 10 seconds or less and have a surface tension between about 47 dyne/cm and about 69 dyne/cm. In some instances, grafted membrane can have a surface tension between 47 dyne/cm and 59 dynes/cm. The grafted membrane can have a dye binding capacity between about 3 µg/cm$^2$ and 40 µg/cm$^2$, or between about 7 µg/cm$^2$ and 15 µg/cm$^2$.

Described herein is a grafted, crosslinked, asymmetric, porous, ultra high molecular weight polyethylene membrane having a bubble point between about 78 psi and 160 psi when determined by an ethoxy-nonafluorobutane bubble point test. The membrane can have one or more neutral groups or ion exchange groups grafted to one or more surfaces of the membrane, wherein the one or more neutral groups or ion exchange groups are crosslinked with a crosslinker, such as N,N'-methylenebisacrylamide. The grafted membrane can has a water flow rate that is at least 50% of the water flow rate of an ungrafted, asymmetric, porous ultra high molecular weight polyethylene membrane having a bubble point between about 78 psi and about 160 psi when determined by an ethoxy-nonafluorobutane bubble point test. The membrane can wets in water in 10 seconds or less. The membrane can have a surface tension between 70 dyne/cm and 72 dynes/cm.

Described herein is a method of making a grafted, asymmetric, porous ultra high high molecular weight polyethylene membrane. An asymmetric, ultra high molecular weight polyethylene membrane is contacted with an alcohol solution having a type II photoinitiator therein. The membrane is then contacted with an aqueous exchange solution comprising one or more of sodium sulfate and sodium persulfate. Then, the membrane is contacted with an aqueous grafting solution that includes one or more of an anionic monomer, cationic monomer, and neutral monomer, and one or more of sodium sulfate and a type I photoinitiator, for example sodium persulfate. Next, the membrane is exposed to ultraviolet electromagnetic radiation, thereby resulting in a grafted, asymmetric, porous ultra high molecular weight polyethylene membrane.

In some instances, the neutral monomer is N-(hydroxymethyl)acrylamide. In some versions, the neutral monomer is 2-hydroxyethylacrylate. In some versions, the cationic monomer is (3-acrylamidopropyl)trimethylammonium chloride. In some versions, the cationic monomer is (vinylbenzyl)trimethylammonium chloride. In some versions, the anionic monomer is acrylamidopropyl sulfonic acid.

In some versions, the cationic monomer is selected from the group consisting of 2-(dimethylamino)ethyl hydrochloride acrylate, [2-(acryloyloxy)ethyl]trimethylammonium chloride, 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, [2-(methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-Aminopropyl)-methacrylamide hydrochloride, diallyldimethylammonium chloride, allylamine hydrochloride, vinyl imidazolium hydrochloride, vinyl pyridinium hydrochloride and vinyl benzyl trimethyl ammonium chloride.

In some versions, the anionic monomers is selected from the group consisting of 2-ethylacrylic acid, acrylic acid, 2-carboxyethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3-methacrylamido phenyl boronic acid, vinyl sulfonic acid and vinyl phosphonic acid.

Each of the monomers can be provided in a suitable salt form. As one example, the monomer vinyl sulfonic acid can be provided as vinyl sulfonic acid sodium salt.

In some versions, the aqueous grafting solution further includes a crosslinker, such as N,N'-methylenebisacrylamide.

In some versions, the grafting solution can include one or more of (3-acrylamidopropyl)trimethylammonium chloride, N-(hydroxymethyl)acrylamide), and (vinylbenzyl)trimethylammonium chloride. In some versions, the grafting solution includes benzophenone. In some versions, the aqueous solution comprises one or more of sodium sulfate and sodium persulfate.

In some versions, the grafted, asymmetric, porous ultra high molecular weight polyethylene membrane has a bubble point between about 78 psi and about 160 psi.

Described herein is a method of making a grafted, crosslinked, asymmetric, porous ultra high molecular weight polyethylene membrane. The method includes contacting an asymmetric, ultra high molecular weight polyethylene membrane with an alcohol solution having benzophenone, contacting the polyethylene membrane with an aqueous exchange solution, contacting the membrane with an aqueous grafting solution, and exposing the membrane to ultraviolet electromagnetic radiation, thereby resulting in a grafted, crosslinked, asymmetric, porous ultra high molecular weight polyethylene membrane. The aqueous grafting solution includes one or more of an anionic monomer, cationic monomer, and neutral monomer, sodium sulfate, sodium persulfate or potassium persulfate, and a crosslinker. The grafted, crosslinked, membrane can have a surface tension between about 70 dyne/cm and about 72 dyne/cm, or between about 47 dyne/cm and about 69 dyne/cm, or between about 47 dyne/cm and about 59 dyne/cm. The crosslinker can be N,N'-methylenebisacrylamide. The neutral monomer can be dimethylacrylamide and the cationic monomer can be (3-acrylamidopropyl) trimethylammonium chloride. The neutral monomer can be dimethylacrylamide and the anionic monomer can be 2-Acrylamido-2-methyl-propane sulfonic acid acid.

Also described herein is a method of removing an impurity from a liquid. The method includes contacting the liquid with a membrane grafted as described herein. The impurity can be a positively charged particle, such as positively charged gold, or a positively charged ion, such as methylene blue. The impurity can be a negatively charged particle, such as negatively charged gold, or a negatively charged ion, such as Ponceau-s.

The invention is based, in part, on the discovery that molecules can be grafted on the surface of an asymmetric, porous ultra high molecular weight polyethylene membrane using an ultraviolet radiation energy source. In particular, the ultra high molecular weight polyethylene membrane has a tight pore size, and thus a high bubble point, as determined by an HFE 7200 (ethoxy-nonafluorobutane) bubble point test. Typically, the membranes, both grafted and ungrafted, have a bubble point between about 78 psi and about 160 psi when determined by an HFE 7200 (ethoxy-nonafluorobutane) bubble point test. Membranes having such a bubble point are difficult to modify by other methods, such as electron beam treatment, plasma grafting, and gamma radiation grafting, because those methods can degrade the membrane structure such that the grafted membrane does not retain the strength of the ungrafted membrane. In contrast, the grafted membranes described herein retain substantial strength upon completion of the grafting procedure. Additionally, grafting has minimal impact on the bubble point of the membrane.

When the monomers grafted onto the membrane are charged, the surface of the grafted membrane has ion exchange groups grafted to one or more surfaces of the membrane. These ion exchange groups improve the filtration performance of charged particles. Since the ion exchange groups are chemically bonded to the membrane surface, the charge is stably applied to the surface, which is an improvement to methods of altering the electrostatic charge of a membrane without chemical modification. Additionally, the charge is stable in hydrogen peroxide and other chemical solutions.

The membranes grafted by the methods described herein are typically asymmetric, which permits modification of the membrane without plugging the membrane pores. Modifying a membrane having a symmetric pore structure with comparable pore size is more likely to result in plugging of the membrane pores and, consequently, reduced flow rates.

The molecules that are grafted can be a combination of organic moieties that include ion exchange groups and organic moieties with neutral groups. The charged and neutral moieties can be grafted to the porous membrane utilizing a combination of adsorbed type II photoinitiator on the membrane surfaces and a type I photoinitiator in the grafting solution. It was discovered that the use of a type II photoinitiator adsorbed on the membrane surface and type I photoinitiator present in the grafting solution resulted in a small pore sized porous polymeric hydrophilic membranes with superior water flow rate. The grafted membranes could also be used for removing ions and charged particles from liquids.

The methods described herein can also create grafted membranes more quickly than other methods. In some instances, grafting can be achieved at line speeds of 15 feet/minute or less, and more preferably 9 feet/minute or less. In some instances, grafting can be achieved at line speeds of up to 9 feet/minute or, in some instances, up to 15 feet/minute. In contrast, U.S. Pat. No. 6,379,551 (Lee et al.) describes a process for grafting on porous polyethylene support material using gamma radiation at an approximate dose of 6,000 R/hour for 60 hours. In contrast, the methods described in the present application can be used to graft a similar amount of membrane in about an hour.

In some instances, the neutral monomer N-(hydroxymethyl)acrylamide can be replaced with a crosslinker, for example N,N-methylenebisacrylamide, in the aqueous grafting solution to yield a hydrophilic grafted membrane. Providing improved hydrophilicity is desirable for some applications, though for other application a more hydrophobic membrane is suitable.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 10A is the tight side (e.g., having smaller pores) at 10,000× magnification. FIG. 10B is the open side (e.g., having larger pores) at 10,000× magnification. FIG. 10C is a cross-sectional view, with the open side on top and the tight side on bottom, at 4,000× magnification.

DETAILED DESCRIPTION OF THE INVENTION

Figure 1:
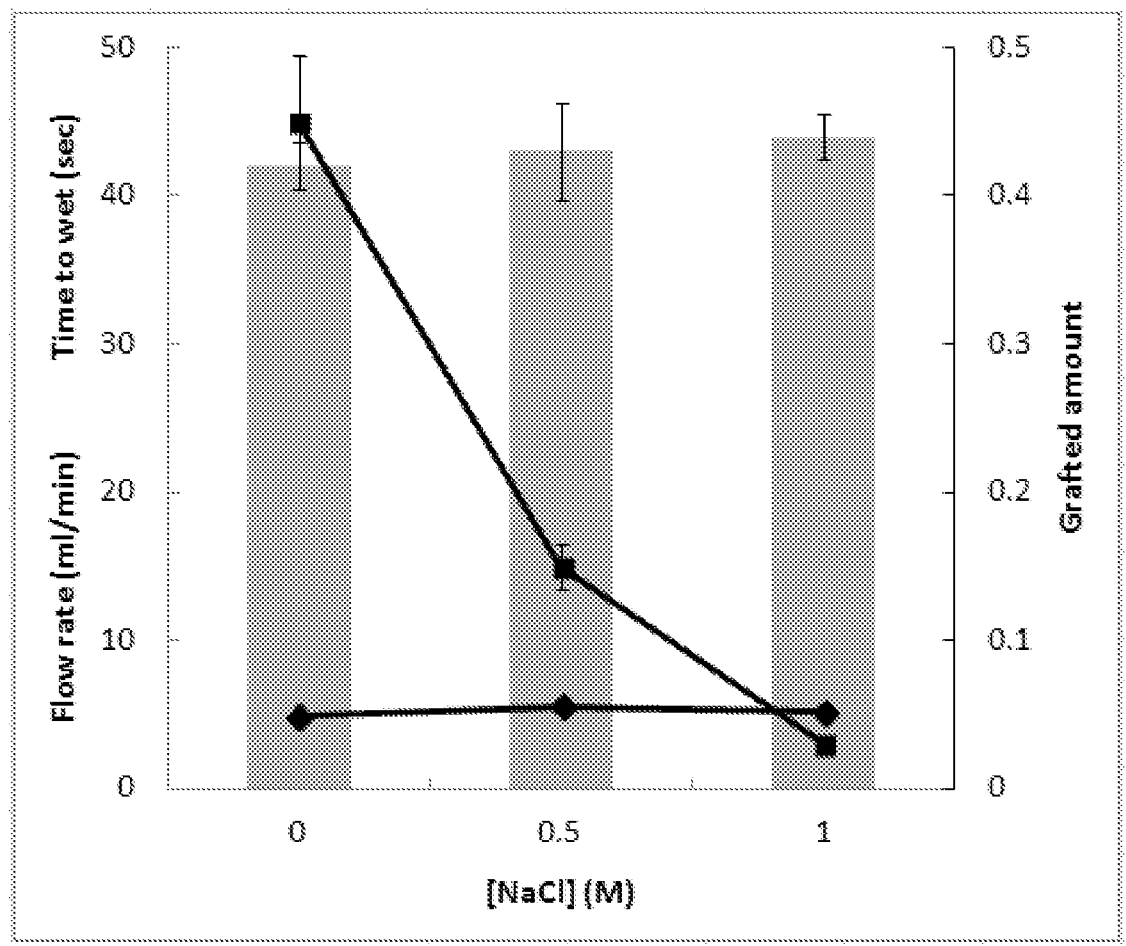
FIG. 1 is a graph showing grafting amount (bars), water flow rate (diamonds), and time to wet in DI water (squares). Wetting time is the time it takes for the membrane to become translucent after soaking in DI water. Faster wetting time indicates a more hydrophilic membrane.
Figure 2:
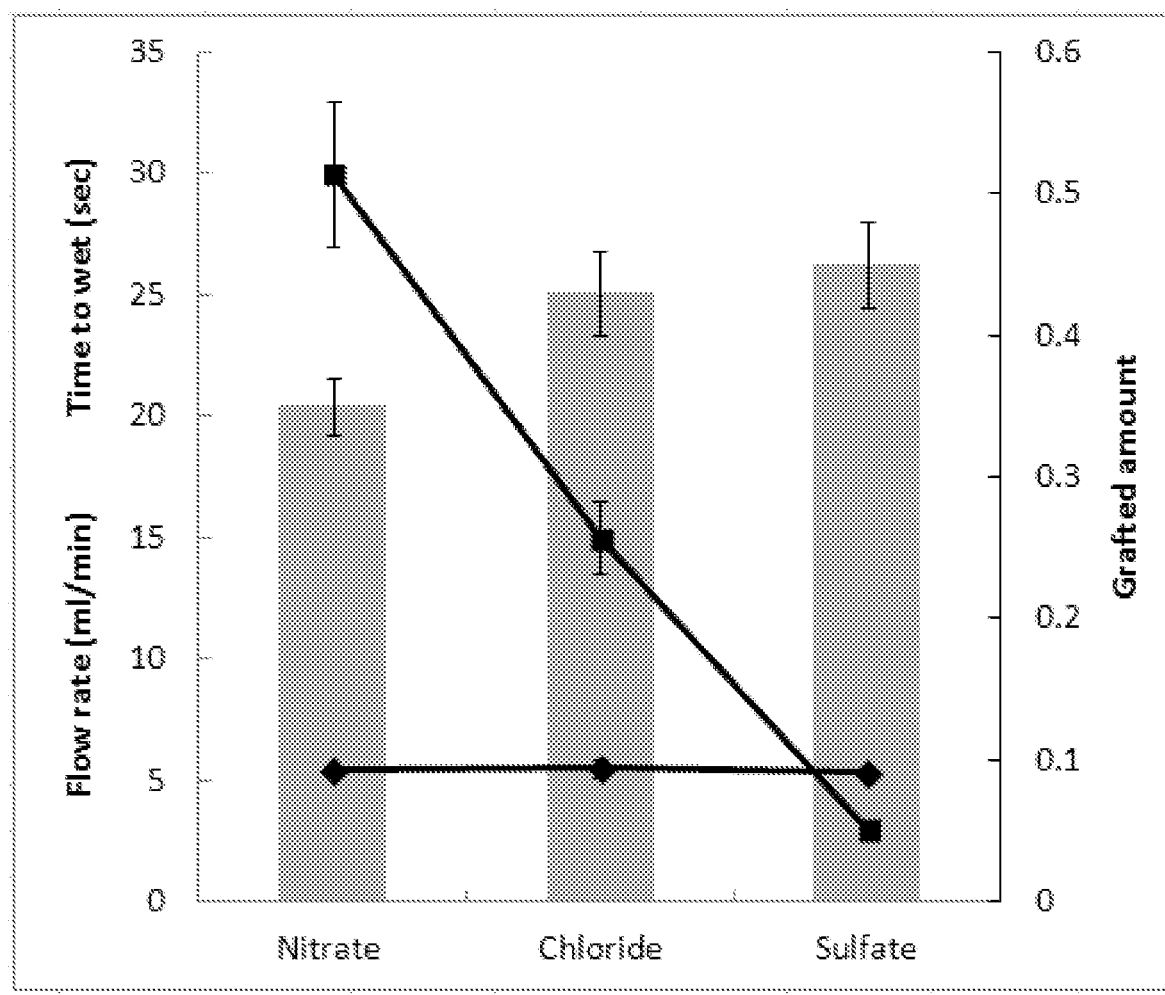
FIG. 2 is a graph showing grafting amount (bars), water flow rate (diamonds), and time to wet in DI water (squares). Wetting time is the time it takes for the membrane to become translucent after soaking in DI water. Faster wetting time indicates a more hydrophilic membrane.

A description of example embodiments of the invention follows.

Monomer Grafting onto Membranes

Grafting refers to chemically linking a moiety, such as a monomer or other molecule, to polymeric porous membrane surfaces, including inner pore surfaces, of a porous membrane. The methods described herein pertain to grafting monomers onto one or more surfaces of an asymmetric, porous, ultra high molecular weight polyethylene membrane.

In order to graft the monomer onto a UHMWPE membrane, the membrane is typically wet with an alcohol, such as isopropyl alcohol (IPA), which can include a type II photoinitiator, such as benzophenone. Optionally, the membrane is placed in an aqueous exchange solution, which can include a chaotropic salt or a sulfate salt and a type I photoinitiator, such as a persulfate salt (e.g., sodium persulfate). Typically, the concentration of the sulfate salt can be 0.5 M or less, and the concentration of the persulfate salt can be 0.5 M or less. Rinsing with the aqueous exchange solution removes the IPA from the membrane. Next, the membrane is soaked in a grafting solution (detailed below in the examples in wt %). Typically, the grafting solution contains graftable monomers, a sulfate salt, and a persulfate salt. Excess grafting solution can be removed from the porous membrane by squeezing the membrane using a roller (or similar treatment). The impregnated membrane is then exposed to electromagnetic radiation, typically within the ultraviolet portion of the spectrum, or other suitable energy source to graft the moieties onto the porous polymeric membrane surfaces, including inner pore surfaces.

Neutral monomers refer to those monomers that do not have ionizable groups or ion exchange groups that can be grafted to the membranes. Examples include, but are not limited to, N-(hydroxymethyl)acrylamide and 2-hydroxyethylacrylate.

Charged moieties refer to those monomers and other molecules that have ion exchange groups that can be grafted to the membranes. Examples of ion exchange groups include carboxylic acids, sulfonic acids, and ammonium halide groups. Examples include acrylamide, N,N-dimethyl acrylamide, vinylbenzyl trimethylammonium chloride, vinyl sulfonic acid (including salts), acrylic acid, and styrene sulfonic acid. In general the charged monomers can be cationic or anionic.

Suitable cationic monomers include acrylate, methacrylate, acrylamide, methacrylamide and vinyl types having a quaternary ammonium, imidazolium, phosphonium, guanidinium, sulfonium, or pyridinium functionality. Examples of suitable acrylate monomers include 2-(dimethylamino)ethyl hydrochloride acrylate and [2-(acryloyloxy)ethyl]trimethylammonium chloride. Examples of suitable methacrylate monomers include 2-aminoethyl methacrylate hydrochloride, N-(3-aminopropyl) methacrylate hydrochloride, 2-(dimethylamino)ethyl methacrylate hydrochloride, [3-(methacryloylamino)propyl]trimethylammonium chloride solution, and [2-(methacryloyloxy)ethyl]trimethylammonium chloride. Examples of suitable acrylamide monomers include acrylamidopropyl trimethylammonium chloride. Examples of suitable methacrylamide monomers include 2-aminoethyl methacrylamide hydrochloride, N-(2-aminoethyl) methacrylamide hydrochloride, and N-(3-Aminopropyl)-methacrylamide hydrochloride. Other suitable monomers include diallyldimethylammonium chloride, allylamine hydrochloride, vinyl imidazolium hydrochloride, vinyl pyridinium hydrochloride and vinyl benzyl trimethyl ammonium chloride.

Suitable anionic monomers include acrylate, methacrylate, acrylamide, methacrylamide and vinyl types having a sulfonic acid, carboxylic acid, phosphonic acid or phosphoric acid functionality. Examples of suitable acrylate monomers include 2-ethylacrylic acid, acrylic acid, 2-carboxyethyl acrylate, 3-sulfopropyl acrylate potassium salt, 2-propyl acrylic acid, and 2-(trifluoromethyl)acrylic acid. Examples of suitable methacrylate monomers include methacrylic acid, 2-methyl-2-propene-1-sulfonic acid sodium salt, mono-2-(methacryloyloxy)ethyl maleate, and 3-sulfopropyl methacrylate potassium salt. An example of a suitable acrylamide monomer is 2-acrylamido-2-methyl-1-propanesulfonic acid. An example of a suitable methacrylamide monomers is 3-methacrylamido phenyl boronic acid. Other suitable monomers include Vinyl sulfonic acid (or vinylsulfonic acid sodium salt) and vinyl phosphonic acid (and salts thereof).

Other suitable monomers are N-(hydroxymethyl)acrylamide (HMAD), (3-acrylamidopropyl)trimethylammonium chloride (APTAC), and (vinylbenzyl)trimethylammonium chloride (VBTAC), the structures of which are illustrated below:

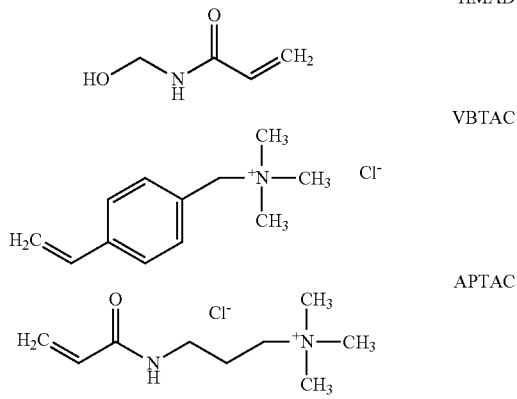

The properties of the grafted membrane will generally depend on the ratio of grafted charged groups to grafted neutral groups.

The membranes that are grafted are typically ultra high molecular weight polyethylene (UHMWPE) membranes. Generally, UHMWPE membranes are formed from a resin having a molecular weight from about 2,000,000 Daltons to about 8,000,000 Dalton.

Typically, the membranes that are grafted are asymmetric. In one example of an asymmetric membrane, the pore size on one face and region of the membrane is larger than on the opposing face and region. In another example, asymmetric structures can exist where the pore size on the opposing faces (and regions) of the membrane are larger while a central region of the membrane has a smaller pore size than either of the faces (e.g., an hour glass). In other versions the microporous membrane can have an essentially symmetric pore structure across its thickness (substantially the same pore size across the thickness of the membrane).

The grafted UHMWPE membranes in versions of the invention can include flat sheet membranes, non-woven substrates, hollow fiber membranes, or nanofibers formed into a membrane or formed on top of a porous support or porous membrane. The membranes can be potted into a housing or cartridge along with suitable endcaps for fluid inlet and outlet, provided with a core and cage as needed for support, and formed into filter cartridges or devices. Membrane support materials like webs, nets, and the like can also be used and may be pleated with the membrane. The membranes can be pleated or used as a disc or hollow fiber. The grafted membranes are advantageous in that the grafting alters the surface energy of the base membrane and the modified grafted membranes can be used in aqueous fluids like tetramethylammonium hydroxide without prewetting, for example by using IPA. These grafted membranes resist dewetting in gas containing liquids like those containing hydrogen peroxide. The membranes in versions of the invention can be used for removing positively charged or negatively charged impurities from liquids that flow through the membrane in addition to removing particles by sieving retention. In some versions of the invention the grafted membranes can be used to remove charged impurities, including particles and ions, from organic liquids or solutions containing organic liquids.

The UHMWPE membranes in versions of the invention include those having surfaces, including pores, that are grafted with charged or neutral moieties. The charged or neutral moieties can have styrene, vinyl, acrylate, methacrylate, acrylamide, and methacrylamide functionality. The precursor moieties can independently contain basic ion exchange groups such as ammonium groups, neutral functional groups like hydroxyl or ether linkages, acidic ion exchange groups like sulfonic acid or carboxylic acid groups. The grafted groups increase the charge and surface energy on the base porous membranes thereby changing the hydrophilicity and non-sieving retention properties of the base porous polymeric membranes.

The grafting method typically utilizes a combination of type I and type II photoinitiators. A wetting solution typically contains a type II photoinitiator, such as benzophenone. The photoinitiator can be deposited on the membrane surfaces, including pore surfaces, from an organic solution, such as isopropyl alcohol (IPA), during a brief soak (e.g., 10-50 seconds). The porous membrane can be subsequently rinsed with an aqueous exchange solution to remove the organic solvent (e.g., IPA) while leaving at least some, and in some instances substantially all, of the adsorbed photoinitiator on the porous membrane surfaces. The organic solvent can be removed from the porous membrane surfaces with an aqueous exchange solution containing a salt, such as sodium chloride, a nitrate salt, a sulfate salt, and a persulfate salt. The rinsed membrane can be subsequently soaked in an aqueous grafting solution that contains the graftable moieties, such as the monomers (which may be neutral or may include anionic or cationic ion exchange groups), a sulfate salt and a persulfate salt (1-5 min). The persulfate salt is a different radical initiator from the benzophenone photoinitiator and is primarily present in the grafting solution. After soaking in the grafting solution, excess grafting solution is removed from the membrane by squeezing using a roller (or similar treatment) and this moiety-impregnated membrane is exposed to ultraviolet light or other suitable energy source to graft the combination of moieties onto the UHMWPE membrane. The grafted UHMWPE membranes prepared in this way are hydrophilic compared to the ungrafted UHMWPE membranes and have greater flow rates than grafted porous membranes that did not have the combination of adsorbed photoinitiator and a different radical initiator in the exchange and grafting solutions. The grafted membrane after UV treatment can be extracted with methanol and water to clean the membranes.

It was discovered that various vinyl, acrylate, and acrylamide moieties containing basic and acidic ion exchange groups and neutral groups could be grafted onto porous membranes with very small pore sizes to produce hydrophilic membranes.

Porosimetry Bubble Point

A porosimetry bubble point test method measures the pressure required to push air through the wet pores of a membrane. A bubble point test is a well-known method for determining the pore size of a membrane.

Membrane Surface Tension

Surface tension represents the force per unit length, and is typically described as is the force in dynes required to break a film of 1 cm length (e.g., dyne/cm). For membranes, a higher surface tension means that the membrane is more hydrophilic (or less hydrophobic), and a lower surface tension means that the membrane is less hydrophilic (or more hydrophobic). The ungrafted membranes described herein typically have a surface tension of about 31 dyne/cm. All surface tension values reported herein are determined at room temperature, unless otherwise stated. The grafted membranes typically have a higher surface tension than the ungrafted membranes. In some instances, the surface tension is between about 47 dyne and 69 dyne/cm. In other instances, the surface tension is between about 47 dyne/cm and 59 dyne/cm. In other instances, particularly when the monomers are crosslinked, the surface tension can be between 70 dyne/cm and 72 dyne/cm. In general, the surface tension of the grafted membrane can be increased by increasing the concentration of monomers in the grafting solution.

Exemplification

General Experimental

The type II photoinitiator used is benzophenone (BP). Benzophenone (BP) solutions of between 0.4 wt % and 3 wt % by weight in isopropyl alcohol, were used to deposit (BP) on the membrane surfaces from the isopropyl alcohol (IPA) solution during a brief soak. The IPA/BP treated membrane was subsequently rinsed with an aqueous solution containing a sulfate salt at a concentration of 0.5 M or less and a persulfate salt at a concentration of 0.5 M or less. The rinsing with this solution was used to remove the IPA from the membrane. This rinsed membrane was subsequently soaked in an aqueous grafting solution (detailed below in the examples in wt %). The grafting solution contained graftable moieties with ion exchange groups and graftable moieties with neutral groups as well as a sulfate salt and a persulfate salt. Excess grafting solution was removed from the porous membrane by squeezing the membrane using a roller (or similar treatment) and this impregnated membrane was exposed to ultraviolet light or other suitable energy source to graft the moieties onto the porous polymeric membrane surfaces including inner pore surfaces.

After drying the surface modified membranes in an oven at 50° C. for 10 min, wetting was determined by soaking 47 mm membrane disks of the modified membranes in DI water and then recording the time it took for the disk to turn uniformly translucent, which is a sign of hydrophilicity.

Water (or IPA) flow rate was determined by cutting membranes into 47 mm disks and wetting with water (or IPA) before placing the disk in a filter holder with a reservoir for holding a volume of water (or IPA). The reservoir is connected to a pressure regulator. Water (or IPA) was flowed through the membrane under 14.2 psi (pounds per square inch) differential pressure. After equilibrium was achieved, the time for 10 ml of water (or IPA) to flow through the membrane was recorded. For membranes that are more hydrophilic (e.g., having a surface tension of at least about 70 dyne/cm) after modification, water flow rate was determined. For membranes that are less hydrophilic (e.g., having a surface tension of less than about 70 dyne/cm) after modification, IPA flow rate was determined.

EXAMPLE 1

This example demonstrates the preparation of the Benzophenone solution (e.g., a wetting solution).

0.16 grams, 0.4 g, and 1.2 g of Benzophenone (99%, Sigma-Aldrich) were dissolved in 40 ml of isopropyl alcohol to obtain 0.4 wt %, 1 wt % and 3 wt % Benzophenone solution, respectively. Additionally, a 0.5 wt % solution was prepared by dissolving 0.2 g benzophenone in 40 ml IPA.

EXAMPLE 2

This example demonstrates the preparation of an aqueous exchange solution.

1.42 g of sodium sulfate (Sigma) and 0.4 g of sodium persulfate (Sigma) were dissolved in 40 ml of deionized (DI) water with continuous mixing for 10 min at room temperature.

EXAMPLE 3

This example demonstrates the preparation of grafting aqueous solution containing a neutral monomer, a, cationic monomer, and a radical initiator.

In a representative experiment, a solution was made containing 1.25 g hydroxymethylacrylamide (HMAD, 48% in water, Sigma) and 0.1 g vinylbenzyltrimethylammonium chloride monomers (VBTAC, Sigma), 0.71 g sodium sulfate, 0.2 g sodium persulfate, and 17.74 g water. Complete dissolution occurred after continuous mixing for 10 min at room temperature.

EXAMPLE 4

This example illustrates making grafted membranes that are wettable with water and have a surface tension of about 72 dyne/cm.

In a representative experiment, 47 mm disks of 115 psi bubble point ultra high molecular weight polyethylene (UH-MWPE) membrane were wet with 0.5 wt % wetting solution described in Example 1 for 25 seconds. An exchange solution of 1.42 g sodium sulfate and 0.4 g sodium persulfate salt in 40 g water, as described in Example 2, was used to rinse the membrane and remove IPA.

A grafting solution was made containing 0.6 g hydroxyethylacrylate monomer (96%, Sigma); 0, 0.58 g or 1.17 g Sodium Chloride; 0.2 g sodium persulfate; and 18 g deionized water.

Processing steps: After total dissolution of reactants, the solution was placed in a dish and the Benzophenone wetted membrane (after initial treatment with IPA/BP solution as in Example 1 and subsequent rinsing in exchange solution as in Example 2) was introduced into the grafting solution. The dish was covered and the membrane was soaked in the grafting solution for 2 minutes. The membrane disk was removed and placed between 1 mil polyethylene sheets. The excess solution was removed by rolling a rubber roller over the polyethylene/membrane disks/polyethylene sandwich as it lays flat on a table. The polyethylene sandwich was then taped to a transport unit which conveyed the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 5 feet per minute. After emerging from the UV unit, the membrane was removed from the sandwich and immediately placed in DI water, where it was washed by swirling for 5 minutes. Next, the treated membrane sample was washed in methanol for 5 minutes. Following this washing procedure the membrane was dried on a holder in an oven operating at 50° C. for 10 min.

Membrane water flow rate and hydrophilicity as well as level of grafting were determined as described before in the general experimental section. Prior to grafting, the membranes had a flow rate of about 7.5 ml/min. After grafting, the membranes were water wettable, had water flow rates between about 5 ml/min and 10 ml/min and grafted amount of about 0.42. Wetting times ranged from about 45 seconds to less than 5 seconds. Faster wetting time indicates a more hydrophilic membrane.

As depicted in FIG. 1, the membranes were wet with water. Some membranes wet faster and required less time to achieve translucent surface. In one case, the membrane wet and became translucent in less than 10 seconds.

EXAMPLE 5

This example demonstrates illustrates making grafted membranes that are water wettable and have a surface tension of about 72 dyne/cm, as well as flow times of the grafted membranes.

Representative 115 psi bubble point UHMWPE membrane disks were wet with 0.5 wt % benzophenone solution described in Example 1 for 25 seconds. An exchange solution of 1.42 g sodium sulfate and 0.4 g sodium persulfate salt in 40 g water, as described in Example 2, was used to rinse the membrane and remove IPA.

A grafting solution was made containing 0.6 g hydroxyethylacrylate monomer (96%, Sigma); either 0.58 g of sodium chloride or 0.85 g of sodium nitrate (99% reagent plus, Sigma) or 1.42 g of sodium sulfate (99% powder, Sigma); and adjusting the amount of water added to maintain a total of 20 g. The salt concentration in the grafting solution was 0.5M irrespective of salt type. The membrane was then subjected to the processing steps of Example 4.

Membrane water flow rate and hydrophilicity as well as level of grafting were determined as described before in the general experimental section. The examples of grafted membranes wet in times ranging from 3 seconds to 30 seconds. Wetting in less than 5 seconds is advantageous for using filters in a manufacturing environment (decreases tool downtime). The flow rate for the membranes was about 5 ml/min under the test conditions described in the General Experimental section.

EXAMPLE 6

This example illustrates the preparation of grafted porous polymeric membranes that have a surface tension of about 72 dyne/cm and also characterizes their flow properties.

Representative 115 psi bubble point UHMWPE membrane disks were wet with 0.5 wt % benzophenone solution described in Example 1 for 25 seconds. An exchange solution of 1.42 g sodium sulfate and 0.4 g sodium persulfate salt in 40 g water, as described in Example 2, was used to rinse the membrane and remove IPA.

A grafting solution was made containing 0.6 g hydroxyethylacrylate monomer (96%, Sigma); either 0.28 g, 0.71 g and 1.42 g of sodium sulfate (99% powder, Sigma); and adjusting the amount of water added to maintain a total of 20 g. The salt concentration in the grafting solution was 0.1 M, 0.25 M and 0.5 M. The membrane was then subjected to the processing steps of Example 4.

Figure 3:
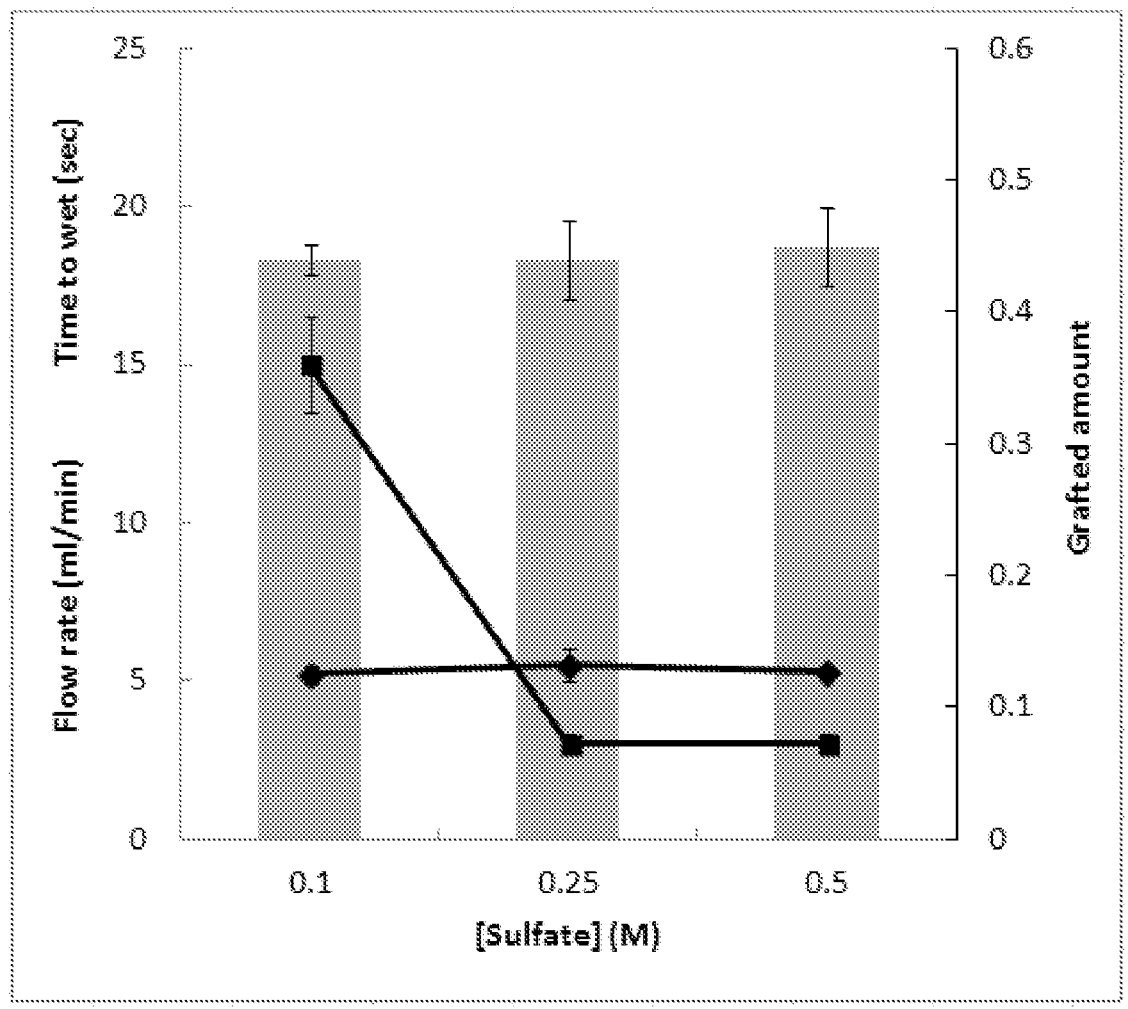
FIG. 3 is a graph showing grafting amount (bars), water flow rate (diamonds), and time to wet in DI water (squares). Wetting time is the time it takes for the membrane to become translucent after soaking in DI water. Faster wetting time indicates a more hydrophilic membrane.

Membrane water flow rate and hydrophilicity as well as level of grafting were determined as described before in the general experimental section. As depicted in FIG. 3, grafted amount was between 0.4 and 0.5, the water flow rate was about 5 ml/min according to the test method in the General Experimental section, and the time to wet ranged from about 15 seconds to less than 5 seconds. Faster time to wet and high flow rate are advantageous in a manufacturing environment because faster wetting can reduce downtime for filter installation and higher flow rates require smaller pumps (less expense) to achieve the same flow rate.

EXAMPLE 7

This example illustrates membranes prepared with type I and type II photoinitiators that wet in water in less than 4 seconds, have flow rates between 10 ml/min and 4 ml/min, and have grafting amounts of about 0.15. The aqueous exchange solution used was described in Example 2.

47 mm disks of 82 psi bubble point rated UHMWPE membrane were wet in 0 wt % or 0.4 wt % Benzophenone solution prepared as described in Example 1 for 25 sec. A grafting solution was made containing 2.1 g hydroxymethylacrylamide (HMAD, 48% in water, Sigma) monomer, 1.42 g Sodium Sulfate, 0.2 g sodium persulfate and 16.3 g water. After total dissolution of reactants, the grafting solution is placed in a dish and the benzophenone wetted membrane was introduced into the grafting solution. The dish was covered and the membrane was soaked for 2 minutes. The membrane disk was removed and placed between 1 mil polyethylene sheets. The excess grafting solution is removed by rolling a rubber roller over the polyethylene/membrane disks/polyethylene sandwich as it lays flat on a table. The polyethylene sandwich is then taped to a transport unit which conveys the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 5 feet per minute. After emerging from the UV unit, the membrane was removed from the sandwich and immediately placed in DI water, where it was washed by swirling for 5 minutes. Next, it was washed in methanol for 5 minutes. Following this washing procedure the membrane was dried on a holder in an oven operating at 50° C. for 10 min.

In addition, a 47 mm grafted membrane disk was prepared by first soaking it in 0.4 wt % benzophenone solution prepared as described in Example 1 for 25 sec. A grafting solution was made containing 2.1 g hydroxymethylacrylamide (HMAD, 48% in water, Sigma) monomer, 1.42 g Sodium Sulfate and 16.5 g water. Sodium persulfate was not added in this case. The membrane was then subjected to the same processing steps as described in the previous paragraph.

Figure 4:
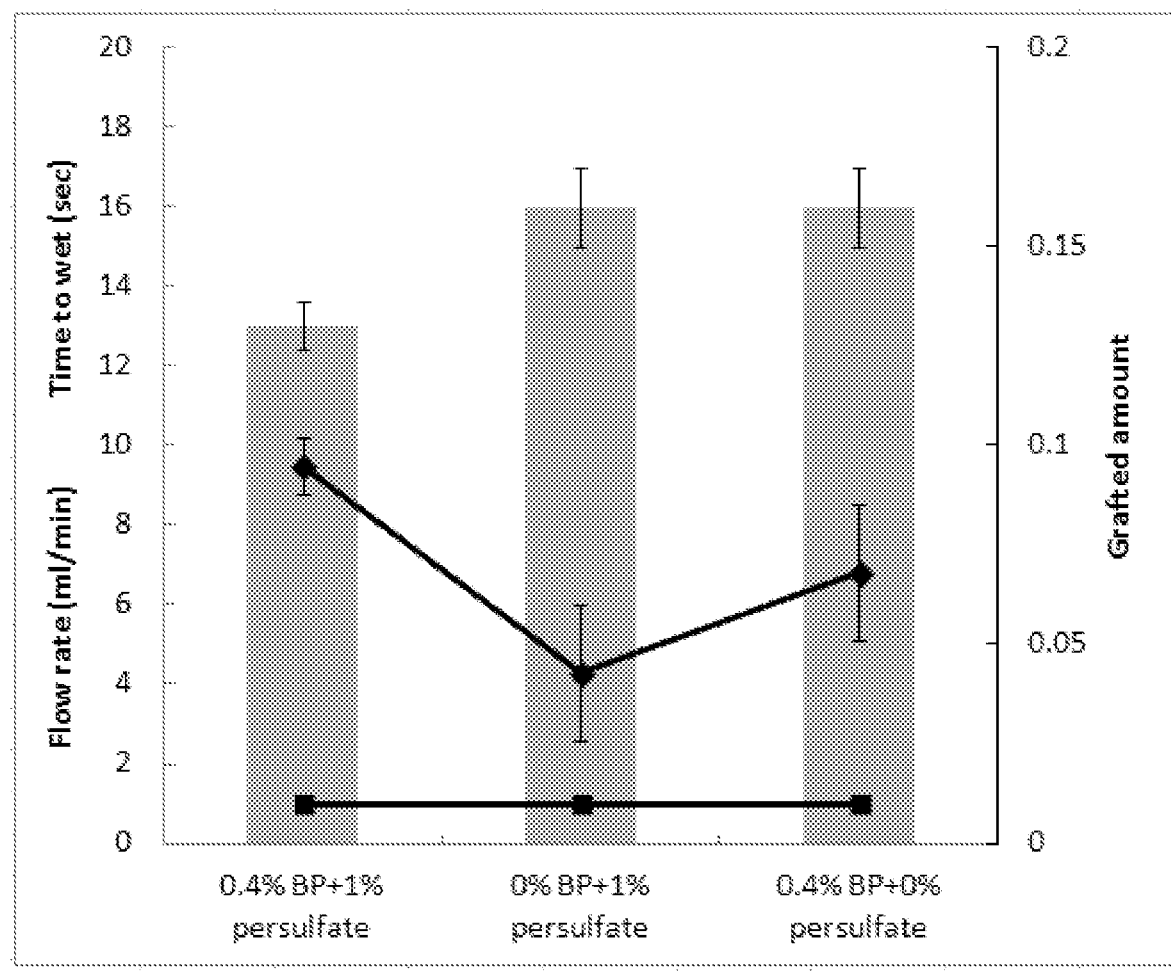
FIG. 4 is a graph showing grafting amount (bars), water flow rate (diamonds), and time to wet in DI water (squares). The presence of free radical generator both on the membrane and in the grafting solution resulted in a hydrophilic membrane with superior water flow rate.

FIG. 4 shows the time to wet, water flow rate, and grafting amount for the different grafting compositions.

EXAMPLE 8

This example demonstrates co-grafting of neutral and positively charged monomers.

47 mm disks of 120 psi bubble point rated UHMWPE membrane were wet in 0.4 wt % benzophenone solution prepared as described in Example 1 for 25 sec. The membrane was treated with the grafting solution described in Example 3. The membrane was then subjected to the same process steps highlighted in Example 4. Resulting membrane water flow rate was 4 ml/min, grafting amount 0.07, and time to wet is 5 sec.

Figure 5:
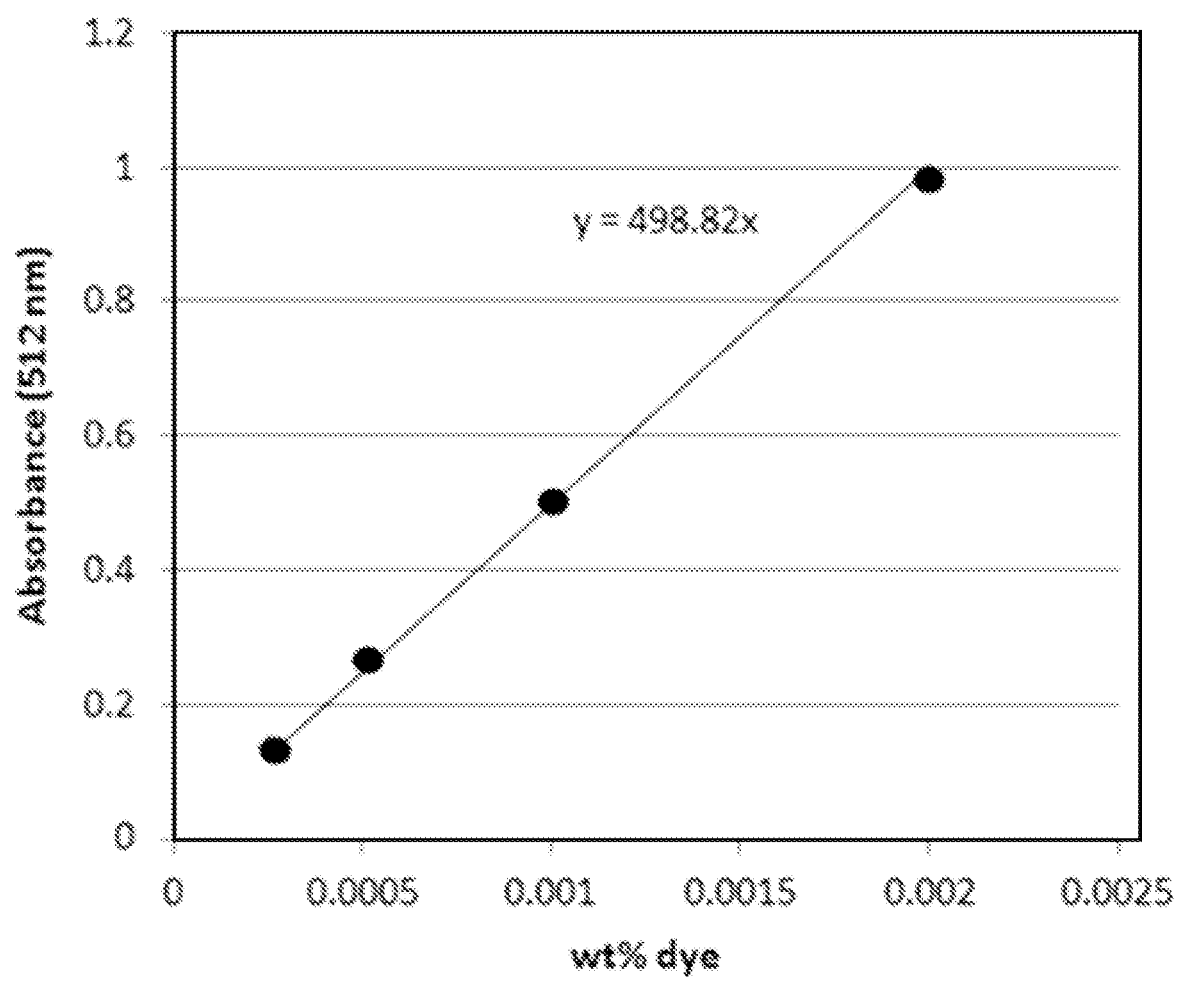
FIG. 5 is a graph showing the absorbance of four dye solutions with known concentrations was determined using a Cary Spectrophotomer operating at 512 nm wavelength and used to obtain a calibration curve. The slope of the curve was used to convert the absorbance of the dye solution before and after soaking the membrane modified by co-grafting neutral and cationic monomers.

An experiment was conducted to confirm that the cationic monomer was also grafted on the membrane surface. The grafted 47 mm disk membrane was wet in water and placed in a beaker containing 0.002 wt % Ponceau-S dye (Sigma). The beaker was covered and the membrane was soaked for 5 minutes with continuous mixing at room temperature. The membrane disk was then removed and the absorbance of the dye solution was measured using a Cary spectrophotometer (Agilent Technologies) operating at 512 nm and compared to the absorbance of starting solution (before membrane soaking). Since the dye is anionic in nature it bound to the positively charged membrane with a dye binding capacity of 3.7 µg/cm². In comparison, ungrafted membrane typically shows a dye binding capacity of less than 0.2μg/cm$^2$. The calibration curve depicted in FIG. 5 was used to convert absorbance data to wt %.

EXAMPLE 9

This example shows the resulting water flow rate of 80 and 100 psi bubble point UHMWPE membranes after modification with grafting compared with another porous membrane non-grafting coating technique comprising a crosslinker.

Grafted membrane: 47 mm disks of 80 and 100 psi HFE 7200 bubble points rated UHMWPE membrane were modified using 0.4 wt % benzophenone solution described in Example 1 and grafting solution described in Examples 3 and subjected to the process steps highlighted in Example 4.

Benchmark membrane: Alternatively, 47 mm disks of 80 and 100 psi HFE 7200 bubble points rated UHMWPE membrane were modified using a surface modification technique that utilizes a crosslinker. Membrane disks were cut and then pre-wetted with IPA, and then soaked in 20% hexylene glycol to exchange IPA. A grafting solution was made containing the acrylamide monomers 0.33 g APTAC, 0.31 g Irgacure 2959 (also known as 1-propanone, 2-hydroxy-1-[4-(2-hydroxyethoxy)phenyl]-2-methyl or 1-[4-(2-Hydroxyethoxy)-phenyl]-2-hydroxy-2-methyl-1-propane-1-one) (Ciba-Geigy, Hawthorn, N.Y.) (a type I photoinitiator), 31.9 g deionized water, 0.99 g N,N-Dimethylacrylamide (DMAM), and 1.6 gram N,N'-Methylenebisacrylamide (MBAm). The Benchmark membrane corresponds to traditional surface modification technique utilizing only a type I photoinitiator and no type II photoinititor. The benchmark membranes are those made using a non-grafting process (e.g., where the monomers are not covalently bonded to the surface of the membrane).

After total dissolution of reactants, the grafting solution is placed in a beaker and the pre-wetted membranes are introduced into the solution. The dish is covered and the membranes are soaked for 2-4 minutes. The membranes are removed and individually placed between 1 mil polyethylene sheets. The excess solution is removed by rolling a rubber roller over the polyethylene/membrane disks/polyethylene sandwich as it lays flat on a table. The polyethylene sandwich is then taped to a transport unit which conveys the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at a line speed of greater than 5 feet per minute and immediately placed in DI water, where it was washed by swirling for 5 minutes. Next, it was washed in methanol for 5 minutes. Following this washing procedure the membrane was dried on a holder in an oven operating at 50° C. for 10 min. Table 1 depicts the resulting flow rate of the membranes after modification and highlights the benefit of grafting technology compared to traditional surface modification by crosslinked chemistry.

TABLE 1

Membrane used were 80 and 100 psi HFE 7200 bubble points rated asymmetric UHMWPE.

| Base membrane | Grafted membrane | Benchmark membrane | Water flow rate (ml/min) |
|---|---|---|---|
| 80 psi bubble point membrane | | | 20 |
| 100 psi bubble point membrane | | | 11.5 |
| | 80 psi bubble point membrane | | 15 |
| | 100 psi bubble point membrane | | 6.5 |
| | | 80 psi bubble point membrane | 9 |
| | | 100 psi bubble point membrane | 2.6 |

EXAMPLE 10

This example illustrates grafted membranes with water flow rates of between 2 ml/min and 4 ml/min, time to wet as low as about 1 second (ranges between about 1 second and 4 seconds), and grafted amounts of between about 0.06 and 0.12. The grafted membrane has a surface tension of about 72 dyne/cm In a representative experiment, 47 mm disks of 115 psi bubble point ultra high molecular weight polyethylene (UHMWPE) membrane were wet with 0.4 wt % wetting solution described in Example 1 for 25 seconds. An exchange solution of 1.42 g sodium sulfate and 0.4 g sodium persulfate salt in 40 g water, as described in Example 2, was used to rinse the membrane and remove IPA.

A grafting solution was made containing 1.25 g, 1.46 g and 1.67 g HMAD monomer (96%, Sigma); 1.42 g Sodium Sulfate; 0.2 g sodium persulfate; and 17.13 g, 16.92 g, 16.7 g deionized water.

Processing steps: After total dissolution of reactants, the solution was placed in a dish and the benzophenone wetted membrane (after initial treatment with IPA/BP solution as in Example 1 and subsequent rinsing in exchange solution as in Example 2) was introduced into the grafting solution. The dish was covered and the membrane was soaked in the grafting solution for 2 minutes. The membrane disk was removed and placed between 1 mil polyethylene sheets. The excess solution was removed by rolling a rubber roller over the polyethylene/membrane disks/polyethylene sandwich as it lays flat on a table. The polyethylene sandwich was then taped to a transport unit which conveyed the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 5 feet per minute. After emerging from the UV unit, the membrane was removed from the sandwich and immediately placed in DI water, where it was washed by swirling for 5 minutes. Next, the treated membrane sample was washed in methanol for 5 minutes. Following this washing procedure the membrane was dried on a holder in an oven operating at 50° C. for 10 min.

Figure 6:
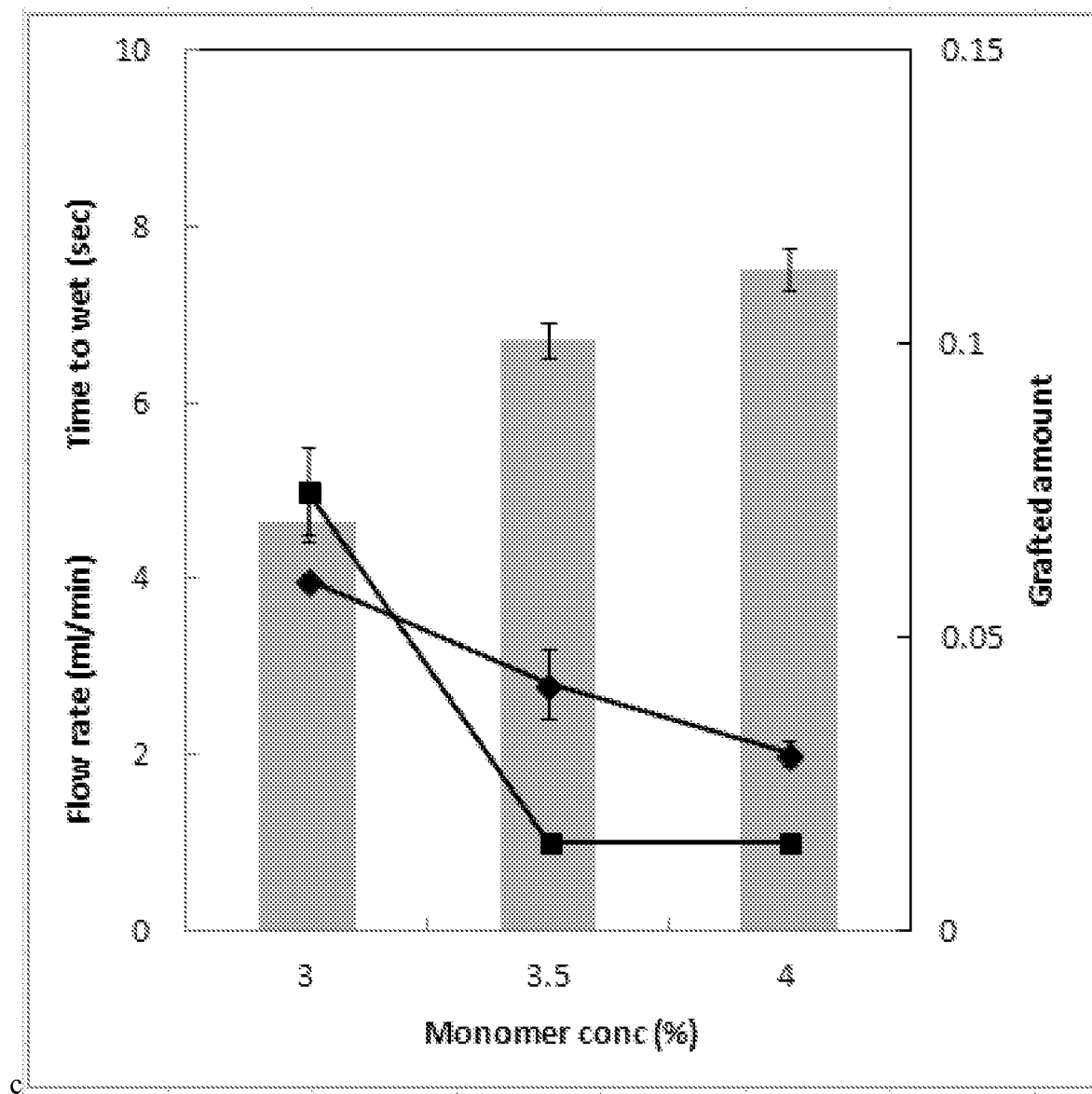
FIG. 6 is a graph showing grafting amount (bars), water flow rate (diamonds), and time to wet in DI water (squares). As more monomer grafts on the surface, resistance to water flow inside the pores also increases.

As depicted in FIG. 6, the membranes were water wettable.

EXAMPLE 11

This example demonstrates the effect of benzophenone concentration in the wetting solution at two different monomer concentrations in the grafting solution on membrane properties.

47 mm disks of 100 psi bubble point ultra high molecular weight polyethylene (UHMWPE) membrane were modified using 0.4 wt %, 1 wt % and 3 wt % benzophenone solution described in Example 1 and grafting solution described in Examples 3 and subjected to the process steps highlighted in Example 4.

Additionally, 47 mm disks of the same UHMWPE membrane were modified using 0.4 wt %, 1 wt % and 3wt % benzophenone (BP) solution described in Example 1 and grafting solution described in Examples 3, except that 2.08 g HMAD was used instead of 1.25 g HMAD, and subjected to the process steps highlighted in Example 4. The mass of water in the grafting solution was adjusted accordingly to maintain a total solution weight of 20 g and HMAD concentration 5 wt %.

Monomer formulations and resulting wettability and flow rate are given in the Table 2.

TABLE 2

|  | 0.4 wt % BP | 1 wt % BP | 3 wt % BP |
| --- | --- | --- | --- |
| 3% HMAD + 0.5% VBTAC | Water wet in 3 sec, flow 6.5 ml/min water flow | Does not wet, 0 ml/min water flow | Does not wet, 0 ml/min water flow |
| 5% HMAD + 0.5% VBTAC | Water wet, 4.5 ml/min water flow | Water wet, 4 ml/min water flow | Does not wet, 0 ml/min water flow |

Figure 7A:
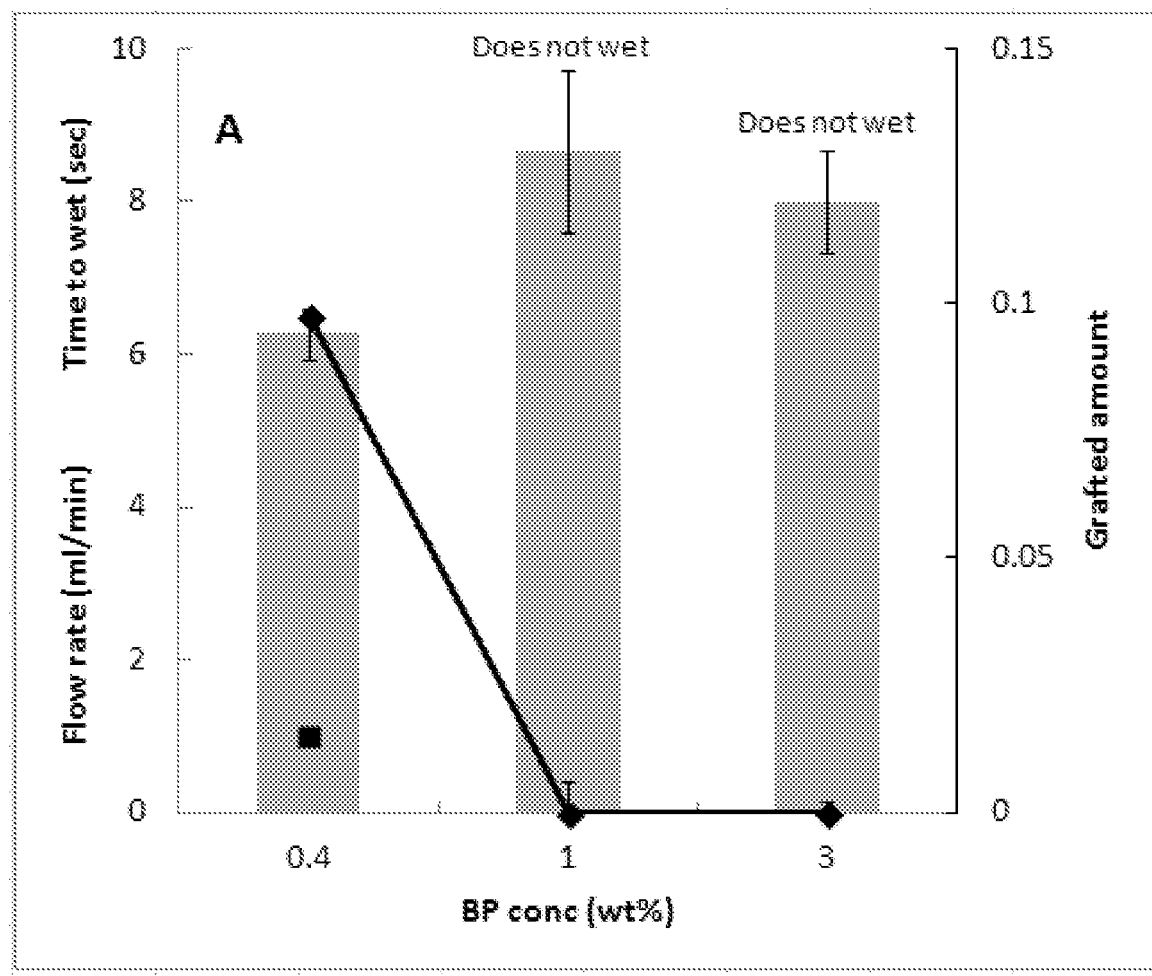
FIGS. 7A is a graph showing grafting amount (bars), water flow rate (diamonds), and time to wet in DI water (squares).

As depicted in the FIG. 7A, some higher benzophenone amounts resulted in membranes that did not wet in water. Even though the monomers successfully grafted on the membrane surface after prewetting in 1 wt % and 3 wt % BP solutions, as evidenced by IR measurements, the grafted membrane did not wet in water and water flow rate could not be measured. The results of this example show that as more benzophenone is used in the grafting solution (increases grafting density), the water flow rate of the resulting membrane unexpectedly decreased.

Figure 7B:
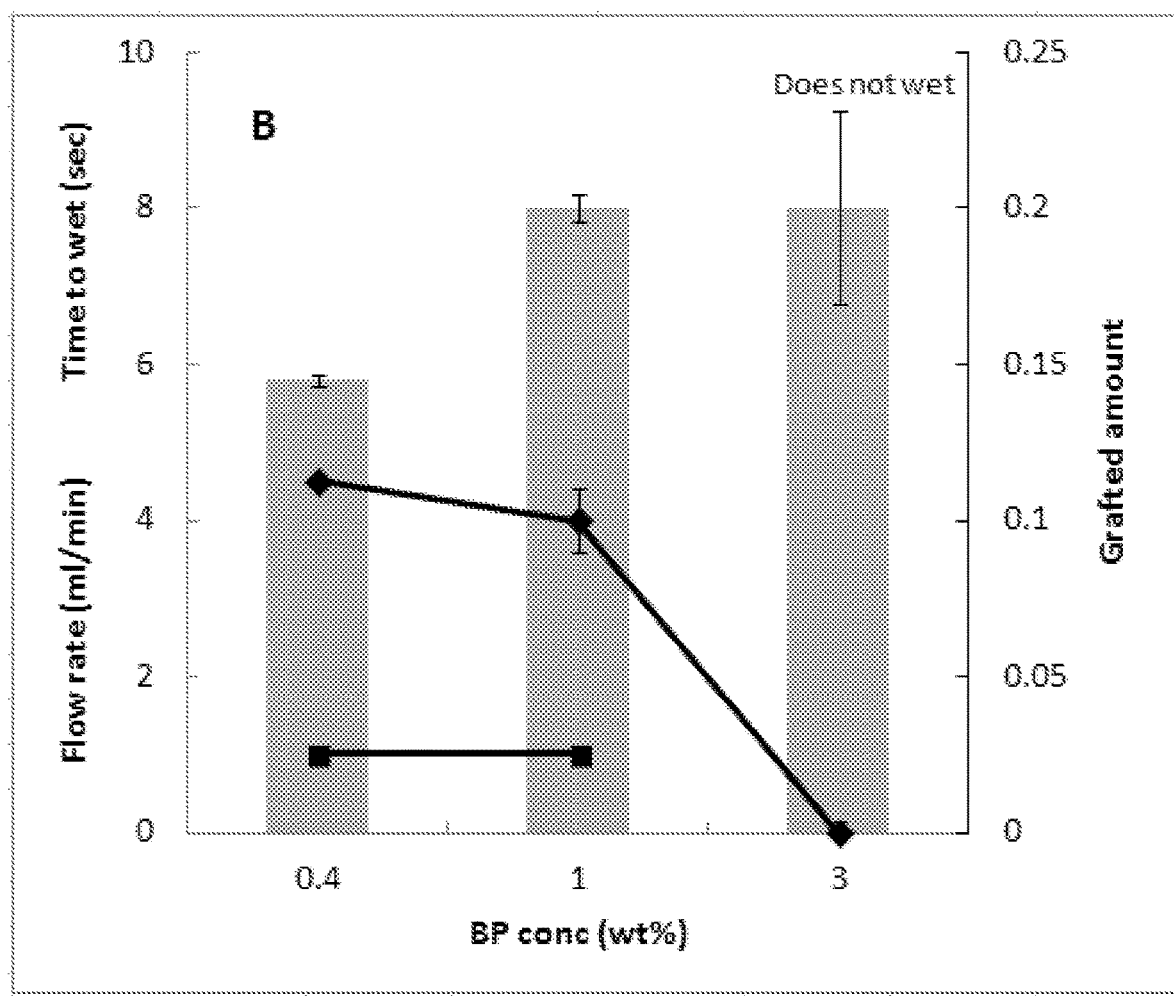
FIG. 7B is a graph showing grafting amount (bars), water flow rate (diamonds), and time to wet in DI water (squares).

FIG. 7B shows that increasing the monomer concentration from 3 wt % to 5 wt % in the grafting solution results in a hydrophilic membrane at 1 wt % BP prewet solution. However, water flow rate is not as high as the 3 wt % HMAD and 0.4 wt % BP case.

EXAMPLE 12

This example demonstrates the effect of line speed on membrane properties.

47 mm disks of 100 psi bubble point ultra high molecular weight polyethylene (UHMWPE) membrane were modified using 0.4 wt % benzophenone solution described in Example 1 and grafting solution described in Examples 3, except that 2.08 g HMAD was used instead of 1.25 g HMAD, and subjected to the process steps highlighted in Example 4 at 5 feet/min, 7 feet/min and 9 feet/min line speed. The mass of water in the grafting solution was adjusted accordingly to maintain a total solution weight of 20 g and HMAD concentration 5 wt %.

Figure 8:
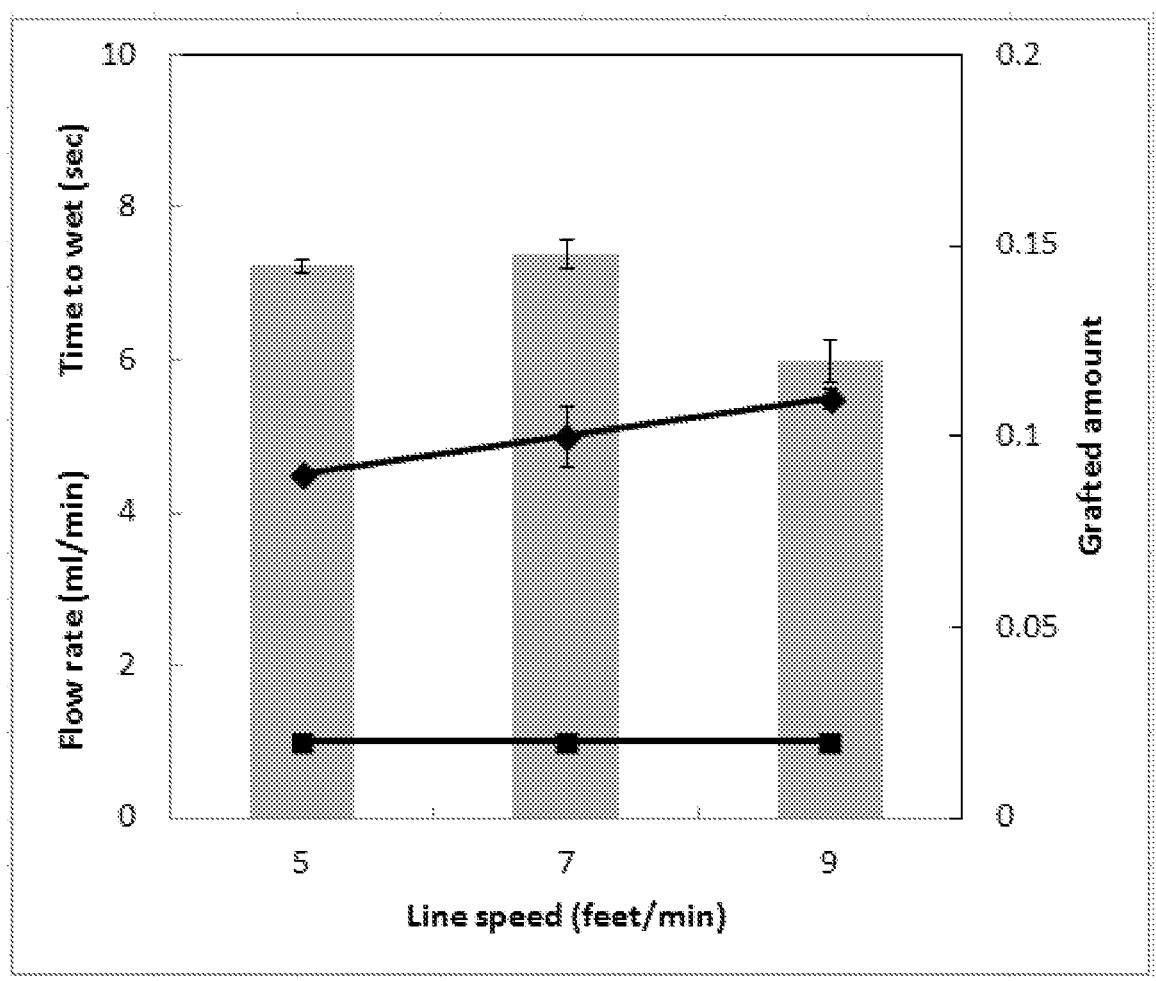
FIG. 8 is a graph showing grafting amount (bars), water flow rate (diamonds), and time to wet in DI water (squares).

The result of this experiment (FIG. 8) shows that less monomer grafts on the membrane at higher line speed. Consequently water flow rate improves but membrane hydrophilicity is not affected.

EXAMPLE 13

Ultrahigh molecular weight polyethylene membrane having 11 psi IPA mean bubble point was grafted. In general, HFE bubble point=IPA bubble point/1.5, assuming no interaction between solvent and membrane (for example swelling).

47 mm disks of 11 psi IPA mean bubble point rated rated UHMWPE membrane were wet with 0.4 wt % benzophenone solution described in Example 1. An aqueous exchange solution of 1.42 g sodium sulfate and 0.4 g sodium persulfate salt in 40 g water was used to rinse the membrane and remove IPA.

A grafting solution was prepared with 1.07 g APTAC ((3-acrylamidopropyl) trimethylammonium chloride, 75 wt % solution, Sigma), 0.83 g HMAD (N-(hydroxymethyl) acrylamide), 0.1 g VBTAC (vinyl benzyl trimethylammonium chloride), 0.71 g sodium sulfate and 0.2 g sodium persulfate in 17.1 g water. Membrane disks were then subjected to the process steps highlighted in Example 4.

Dye binding capacity of the grafted membrane was determined as described in Example 8 at 36 µg/cm$^2$.

EXAMPLE 14

Asymmetric ultra high molecular weight polyethylene membrane having 80 psi HFE 7200 bubble point was used.

A solution of 0.4 wt % benzophenone in IPA was used to wet the membrane. An exchange solution of 0.25 wt % sulfate salt and 1 wt % persulfate salt in water was used to rinse the membrane and remove IPA.

Monomer formulations and resulting wettability and flow rate:

Control membrane (Base membrane) had a water flow rate of 20 ml/min (See Table 1).

Two membranes were grafted with a grafting solution containing 4 wt % HMAD, 0.4 wt % Benzophenone, 0.5 M sulfate salt, and 1 wt % persulfate. Each grafted membrane wet in water. One grafted membrane has a water flow rate of 10.5 ml/min, and the other has a water flow rate of 11 ml/min.

Two membranes were grafted with a grafting solution containing 3 wt % HMAD, 0.4 wt % benzophenone, 0.5 M sulfate salt, and 1 wt % persulfate salt. Each grafted membrane wets in water. One grafted membrane has a water flow rate of 17 ml/min, and the other has a water flow of 13 ml/min.

Two membranes were grafted with a grafting solution containing 3 wt % HMAD, 0.4 wt % BP, 1 wt % tetramethylammonium chloride (vinylbenzyl) (VBTMAC) and 0.5 M sulfate salt and 1 wt % persulfate salt. Each grafted membrane wets in water. One grafted membrane has a water flow rate of 15 ml/min, and the other has a water flow rate of 18 ml/min.

One membrane was grafted with 3 wt % HMAD and 1 wt % APTAC ((3-acrylamidopropyl)trimethylammonium chloride), 0.25 M sulfate salt, and 1 wt % persulfate salt. The grafted membrane was water wettable and has a water flow rate of 7 ml/min.

Two membranes were grafted with 3.5 wt % HMAD, 5 wt % VTMAC, 0.25 wt % sulfate salt, and 1 wt % persulfate salt. Each membrane was water wettable. One grafted membrane has a water flow rate of 18 ml/min, and the other has a water flow rate of 14 ml/min.

These results show that by manipulating the concentration of HMAD in the grafting solution, the flow rate through the grafted membrane can be improved. Results show that water wettable polyolefin based membranes with good water flow times can be made for 80 psi HFE 7200 bubble point membranes. Results also show that water wettable polyolefin based membranes with water flow times of greater than 70%, and in one case as high as 90%, of the base membrane can be made for 80 psi HFE 7200 bubble point rated membrane.

These results also show that a neutral monomer or moiety like hydroxymethylacrylamide in the grafting solution helps to achieve good flow rate and hydrophilicty of the grafted membrane when combined with a monomer that can be ionized or has charge like VBTMAC or APTAC. When a grafting solution that only has an acrylamide monomer with a neutral group like the hydroxyl group in hydroxymethylacrylamide or 2-hydroxyethylacrylate, then the grafting treatment does not result in a membrane that is as wettable or has a high water flow rate as when an acrylamide monomer is combined with a monomer that can be ionized or that has charge.

EXAMPLE 15

100 psi HFE 7200 bubble point ultra high molecular weight polyethylene (UHMWPE) membrane.

A solution of 0.4 wt % benzophenone in IPA was used to wet the membrane. An exchange solution of 0.25 wt % sulfate salt and 1 wt % persulfate salt in water was used to rinse the membrane and remove IPA.

Monomer formulations and resulting wettability and flow rate:

4 wt % HMAD, 0.5 wt % TMAC, 0.25 M sulfate salt, 0.4 wt % BP, 1 wt % persulfate. Wets in water, water flow rate is 5 ml/min, (control is 11.5 ml/min see Table above).

3.5 wt % HMAD, 0.5 wt % VBTMAC, 0.25 M sulfate salt, 0.5 wt % BP, 1 wt % persulfate salt. Wets in water, water flow is 5.5 ml/min and 6 ml/min.

Results show that water wettable polyolefin based membranes with water flow times of greater than 50% of the base membrane can be made for 100 psi HFE 7200 bubble point (UHMWPE) rated membrane by using a combination of two different radical initiators and charged and uncharged moieties.

EXAMPLE 16

UHMWPE membrane with 115 psi HFE 7200 bubble point base asymmetric ultra high molecular weight polyethylene membrane.

A solution of 0.4 wt % benzophenone in IPA was used to wet the membrane. An exchange solution of 0.25 wt % sulfate salt and 1 wt % persulfate salt in water was used to rinse the membrane and remove IPA.

Monomer formulations and resulting wettability and flow rate:

3.5 wt % HMAD, 0.25 M sulfate salt, 0.4 wt % BP(benzophenone), 1 wt % persulfate salt. Not water wettable all areas.

4.5wt % HMAD, 0.5 wt % VBTMAC, 0.25 M sodium sulfate salt, 0.4 wt % benzophenone, 1 wt % sodium persulfate. Wets instantly in water, flow in water 3 ml/min (Control flow rate for ungrafted membrane is 7.5 ml/min of water).

5 feet per minute line speed through the UV lamp system.

Results show that water wettable grafted polyolefin based membranes with water flow times of greater than 40% of the base membrane can be made for 115 psi HFE 7200 bubble point rated membrane with a combination of two different radical initiators and charged and uncharged moieties.

EXAMPLE 17

This example illustrates membranes prepared with types I and II photoinitiators and cross-linker that wet in water in less than 4 seconds, have water flow rate of 9 ml/min, have grafting amounts of about 0.9 and dye binding capacity of 12 µg/cm².

47 mm disks of UHMWPE membrane (80 psi HFE bubble point) were wet in 0.4 wt % benzophenone solution prepared as described in Example 1 for 25 sec. A grafting solution was made containing 0.35 g dimethylacrylamide (DMAM, 100% in water, Sigma) and 0.08 g of acrylamidopropyl trimethylammonium chloride (APTAC, 75% in water, Sigma) monomers, 0.06 g N,N'-methylenebisacrylamide (MBAM) crosslinker, 1.42 g Sodium Sulfate, 0.2 g sodium persulfate and 17.9 g water. After total dissolution of reactants, the solution is placed in a dish and the benzophenone wetted membrane was introduced into the solution. The dish was covered and the membrane was soaked for 2 minutes. The membrane disk was removed and placed between 1 mil polyethylene sheets. The excess solution is removed by rolling a rubber roller over the polyethylene/membrane disks/polyethylene sandwich as it lays flat on a table. The polyethylene sandwich is then taped to a transport unit which conveys the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 9 feet per minute. After emerging from the UV unit, the membrane was removed from the sandwich and immediately placed in DI water, where it was washed by swirling for 5 minutes. Next, it was washed in methanol for 5 minutes. Following this washing procedure the membrane was dried on a holder in an oven operating at 50° C. for 10 min.

Membrane water flow rate (9 ml/min) and hydrophilicity (less than 4 sec) as well as level of grafting (0.9) and dye binding capacity (12.2 µg/cm²) were determined as described before in the general experimental section and Example 8.

EXAMPLE 18

This example demonstrates the dye binding capacity of a UHMWPE membrane grafted with a grafting solution containing 2-acrylamido-2-methylpropane sulfonic acid (AMPS) monomer to yield a negatively charged UHMWPE membrane.

47 mm disks of UHMWPE membrane (80 psi HFE bubble point) were wet in 0.4 wt % benzophenone solution prepared as described in Example 1 for 25 sec. A grafting solution was made containing 0.25 g dimethylacrylamide (DMAM, 100% in water, Sigma) and 0.06 g of 2-acrylamido-2-methylpropane sulfonic acid (AMPS, Sigma) monomers, 0.03 g N,N'-methylenebisacrylamide (MBAM) crosslinker, 1.42 g Sodium Sulfate, 0.2 sodium persulfate and 18 g water. After total dissolution of reactants, the solution is placed in a dish and the Benzophenone wetted membrane was introduced into the solution. The dish was covered and the membrane was soaked for 2 minutes. The membrane disk was removed and placed between 1 mil polyethylene sheets. The excess solution is removed by rolling a rubber roller over the polyethylene/membrane disks/polyethylene sandwich as it lays flat on a table. The polyethylenesandwich is then taped to a transport unit which conveys the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 9 feet per minute. After emerging from the UV unit, the membrane was removed from the sandwich and immediately placed in DI water, where it was washed by swirling for 5 minutes. Next, it was washed in methanol for 5 minutes. Following this washing procedure the membrane was dried on a holder in an oven operating at 50° C. for 10 min.

Figure 9:
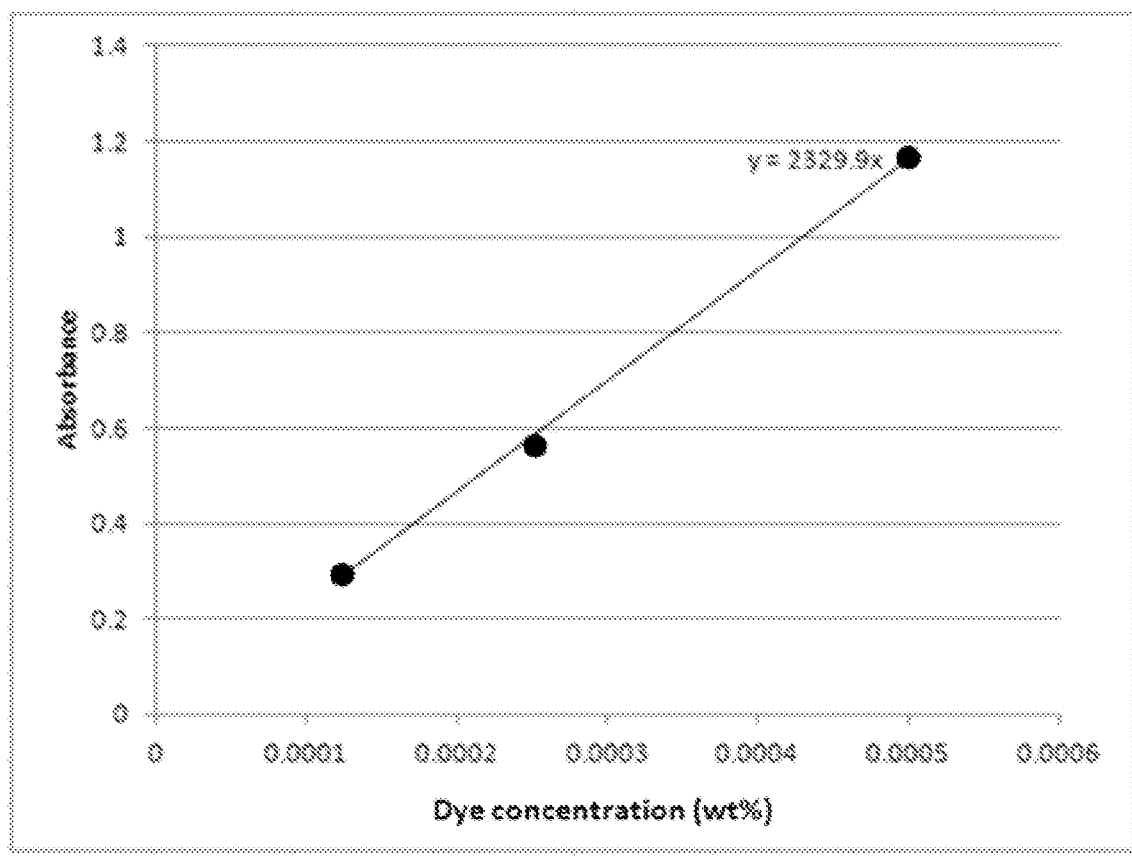
FIG. 9 is a calibration curve showing the absorbance of three methylene blue dye solutions with known concentrations determined using a Cary Spectrophotomer operating at 606 nm wavelength and used to determine dye binding capacity of the grafted membrane.
Figure 10A:
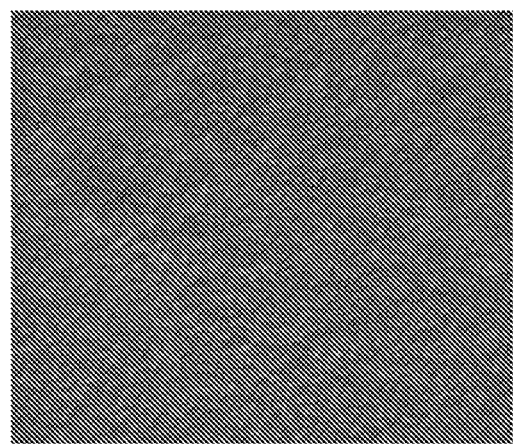
FIGS. 10A-C are SEM images of an ungrafted asymmetric UHMWPE membrane.
Figure 10B:
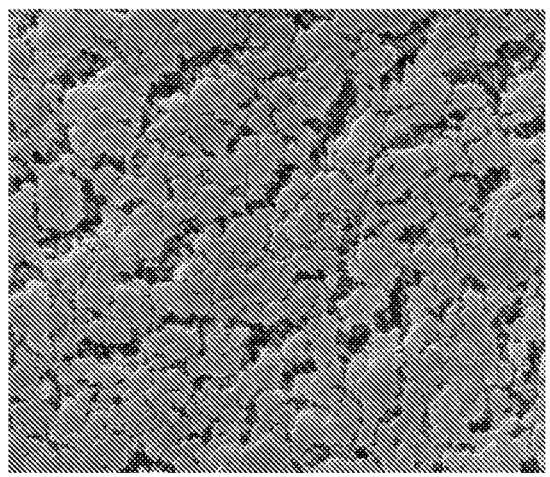
Figure 10C:
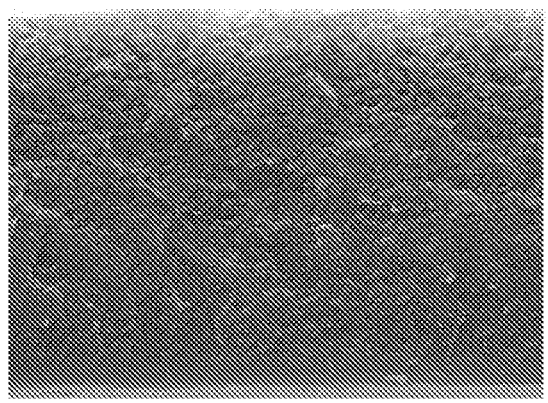

A dry 47 mm disk membrane was placed in a beaker containing 0.00075 wt % methylene blue dye (Sigma). The beaker was covered and the membrane was soaked for 5 minutes with continuous mixing at room temperature. The membrane disk was then removed and the absorbance of the dye solution was measured using a Cary spectrophotometer (Agilent Technologies) operating at 606 nm and compared to the absorbance of starting solution (before membrane soaking). The dye is cationic in nature, and it bound to the negatively charged membrane with an average dye binding capacity of 7 µg/cm$^2$. In comparison, ungrafted membrane typically shows a dye binding capacity of less than 0.3 µg/cm$^2$. The slope of the calibration curve depicted in FIG. 9 was used to convert dye solution absorbance data before and after soaking the membrane to wt % of dye, which is then converted to the mass of dye bound per membrane unit area. Results are shown in FIG. 9.

EXAMPLE 19

This example demonstrates the effectiveness of a UHMWPE membrane modified according to Example 17, in removing a model impurity from model solution at pH 5 and 10.6.

A 50 ppb model solution of gold nano-particles was prepared as follows: 1 ml of gold nanoparticles stock solution (negatively charged 5 nm gold) was add to 2 L of DI water containing 0.1 wt % Triton-x 100. The pH of the solution was adjusted by adding a few drops of 1 M sodium hydroxide or 1 M hydrochloric acid solution.

A 96 mm disk of the membrane prepared according to Example 17 was placed in a test stand and challenged with 52 ml of the 50 ppb model solution with an inlet pressure of 8-15 psi to maintain a flow rate of 25 ml/min. ICP-MS was used to quantify the concentration of gold nano-particles in the filtrate and starting solution. Gold nano-particle removal efficiency of the modified membrane was 100% at pH 5 and 10.6. In comparison, unmodified UHMWPE membrane (80 psi HFE bubble point) showed 60%, and 50% removal efficiency at pH 5 and 10.6, respectively.

EXAMPLE 20

This example demonstrates the effectiveness of a UHMWPE membrane modified according to Example 18, in removing a model impurity from model solution at pH 5.

A 50 ppb model solution of gold nano-particles was prepared as follows: 1 ml of gold nanoparticles stock solution (negatively charged 5 nm gold) was add to 2 L of DI water containing 0.1 wt % Triton-x 100. The pH of the solution was adjusted by adding a few drops of 1 M sodium hydroxide or 1 M hydrochloric acid solution.

A 96 mm disk of the membrane (80psi HFE bubble point) prepared according to Example 18 was placed in a test stand and challenged with 52 ml of the 50 ppb model solution with an inlet pressure of 8-15 psi to maintain a flow rate of 25 ml/min. ICP-MS was used to quantify the concentration of gold nano-particles in the filtrate and starting solution. Gold nano-particle removal efficiency of the modified membrane was 100% at pH 5. In comparison, unmodified UHMWPE membrane (120 psi HFE bubble point) showed 78% removal efficiency at pH 5.

EXAMPLE 21

This example describes the porosimetry bubble point test method that is used to measure the pressure required to push air through the wet pores of a membrane. This method is also referred to as the HFE 7200 bubble point.

The test was performed by mounting a 47 mm disk of a dry membrane sample in a holder with the tight side (e.g., having smaller pores in an asymmetric membrane) of the membrane facing down. The holder is designed in a way to allow the operator to place a small volume of liquid on the upstream side of the membrane. The dry air flow rate of the membrane is measured first by increasing the air pressure on the upstream side of the membrane to 150 psi. The pressure is then released back to atmospheric pressure and a small volume of ethoxy-nonafluorobutane (available as HFE 7200, 3M Specialty Materials, St. Paul, Minn., USA) is placed on the upstream side of the membrane to wet the membrane. The wet air flow rate is then measured by increasing the pressure again to 150 psi. The bubble point of the membrane is measured from the pressure required to displace HFE from the pores of the HFE-wet membrane. This critical pressure point is defined as the pressure at which a first non-linear increase of wet air flow is detected by the flow meter.

The range of observed bubble points for the membranes created by the processes described herein is from 78 psi to 135 psi.

EXAMPLE 22

This example describes a creation of a calibration curve for converting water-methanol wettability into surface tension.

Figure 11:
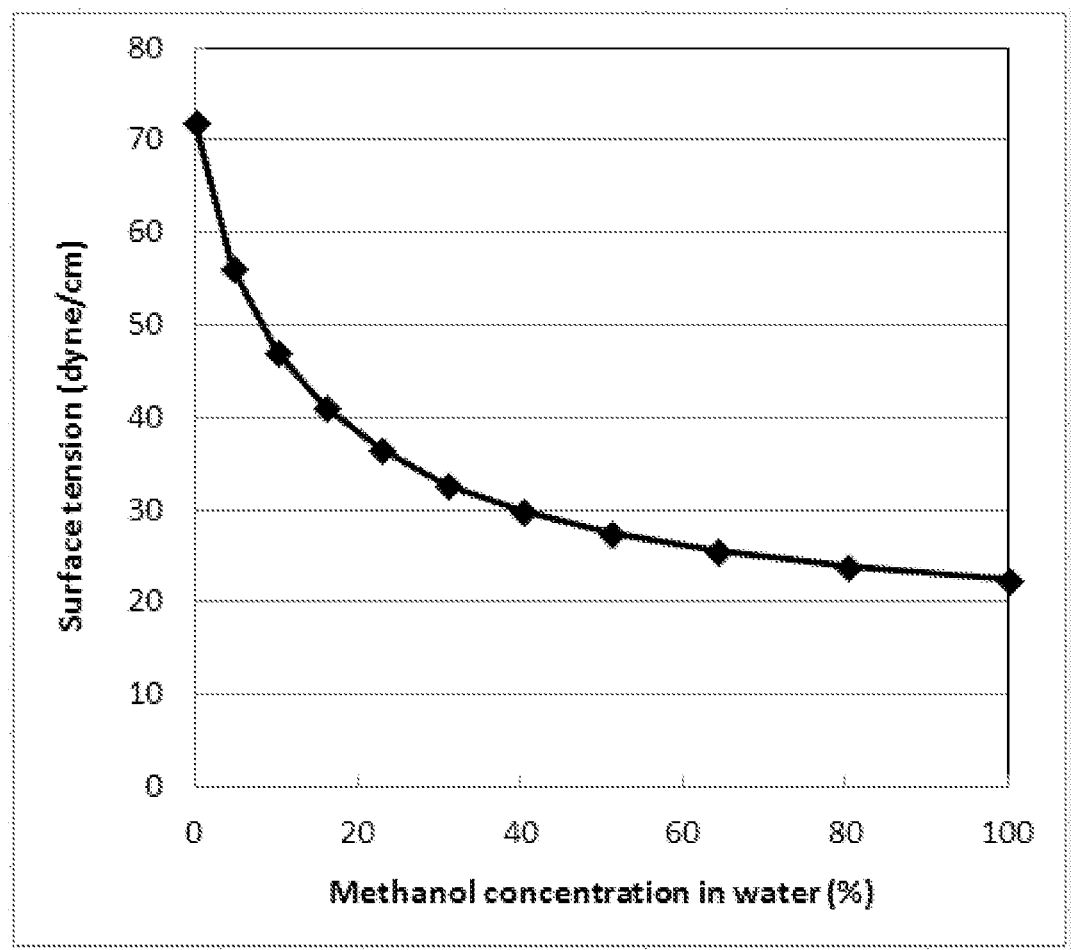
FIG. 11 is a calibration curve for determining surface energy (dynes/cm) based on methanol-water wettability.

Several mixtures of methanol and water were prepared with the ratio of methanol to water ranging from 0% to 100%. The methanol-water mixtures were used to wet the grafted membrane samples for 1 second starting with 0% methanol in water mixture. The least concentration of methanol in water required to wet the membrane was then converted into surface tension (dynes/cm) using the calibration curve in FIG. 11. The calibration curve of FIG. 11 is based on the data provided in Der Chemica Sinica, 2011, 2(6):212-221.

EXAMPLE 23

This example illustrates negatively charged membranes prepared with type I and II photoinitiators and a crosslinker.

Two separate 15×30 cm sheet of UHMWPE membranes were used. The first membrane had a bubble point of 89 psi when challenged with HFE 7200 (ethoxy-nonafluorobutane). The second membrane had a bubble point of 111 psi when challenged with HFE 7200 (ethoxy-nonafluorobutane). Each membrane was wet in 0.4% Benzophenone solution for 25 seconds. A grafting solution was made containing 2.5 g dimethylacrylamide (DMAM, 100% in water, Sigma) and 0.6 g of 2-acrylamido-2-methylpropane sulfonic acid (AMPS, Sigma) monomers, 0.3 g N,N'-methylenebisacrylamide (MBAM) crosslinker, 7.1 g sodium sulfate, 2 g sodium persulfate and 185.5 g water. After total dissolution of reactants, the grafting solution is placed in a dish and the benzophenone-wetted membrane was introduced into the grafting solution. The dish was covered and the membrane was soaked for 2 minutes. The membrane sheet was removed and placed between 1 mil polyethylene sheets. The excess solution is removed by rolling a rubber roller over the polyethylene/membrane disks/polyethylene sandwich as it lays flat on a table. The polyethylene sandwich is then taped to a transport unit which conveys the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 9 feet per minute. After emerging from the UV unit, the membrane was removed from the sandwich and immediately placed in DI water, where it was washed by swirling for 5 minutes. Next, it was washed in methanol for 5 minutes. Following this washing procedure the membrane was dried on a holder in an oven operating at 50° C. for 10 min. The properties of the resulting membrane are described in Table 3:

TABLE 3

|  | 89 psi membrane (Before/After grafting) | 111 psi membrane (Before/After grafting) |
|---|---|---|
| IPA flow rate (ml/min) | 7.6/4.7 | 4.3/3.1 |
| Methylene blue binding capacity ($\mu g/cm^2$) | 0.1/6.2 | 0.2/6.4 |
| Surface tension (dynes/cm) | 31/52 | 31/55 |

EXAMPLE 24

This example illustrates a positively charged membrane prepared with types I and II photoinitiators, and a crosslinker.

A 15×30 cm sheet of UHMWPE membrane (135 psi HFE bubble point) was wet in 0.4% benzophenone solution for 25 sec. A grafting solution was made containing 2.5 g dimethylacrylamide (DMAM, 100% in water, Sigma) and 0.8 g of (3-acrylamidopropyl) trimethylammonium chloride (APTAC 75% solution, Sigma) monomers, 0.3 g N,N'-methylenebisacrylamide (MBAM) crosslinker, 7.1 g sodium sulfate, 2 g sodium persulfate and 185.3 g water. After total dissolution of reactants, the grafting solution is placed in a dish and the benzophenone-wetted membrane was introduced into the solution. The dish was covered and the membrane was soaked for 2 minutes. The membrane sheet was removed and placed between 1 mil polyethylene sheets. The excess solution is removed by rolling a rubber roller over the polyethylene/membrane disks/polyethylene sandwich as it lays flat on a table. The polyethylene sandwich is then taped to a transport unit which conveys the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 9 feet per minute. After emerging from the UV unit, the membrane was removed from the sandwich and immediately placed in DI water, where it was washed by swirling for 5 minutes. Next, it was washed in methanol for 5 minutes. Following this washing procedure the membrane was dried on a holder in an oven operating at 50C for 10 min. The properties of the resulting membrane are described in Table 4.

TABLE 4

|  | 135 psi membrane (Before/After grafting) |
|---|---|
| IPA flow rate (ml/min) | 2.48/1.89 |
| Ponceau-s binding capacity ($\mu g/cm^2$) | 0.3/9.2 |
| Surface tension (dynes/cm) | 31/50 |

EXAMPLE 25

This example illustrates the impact of the disclosed grafting technique on the mechanical properties of the grafted membranes.

The membranes grafted according to Examples 22 and 23 were used in this Example. The tensile strain at break of the membranes (89, 111, and 135 psi HFE bubble points) before and after grafting was evaluated using Instron™ Model 3342 Compression/Tensile instrument equipped with Instron™ Force Transducer model 2519-102, computer and Blue Hill software.

Two samples in the machine direction and two samples in the cross web direction from each membrane were tested by continuously stretching the sample until it breaks. A metal die cutter was used to cut sample with 1"×4.5" dimensions.

Figure 12:
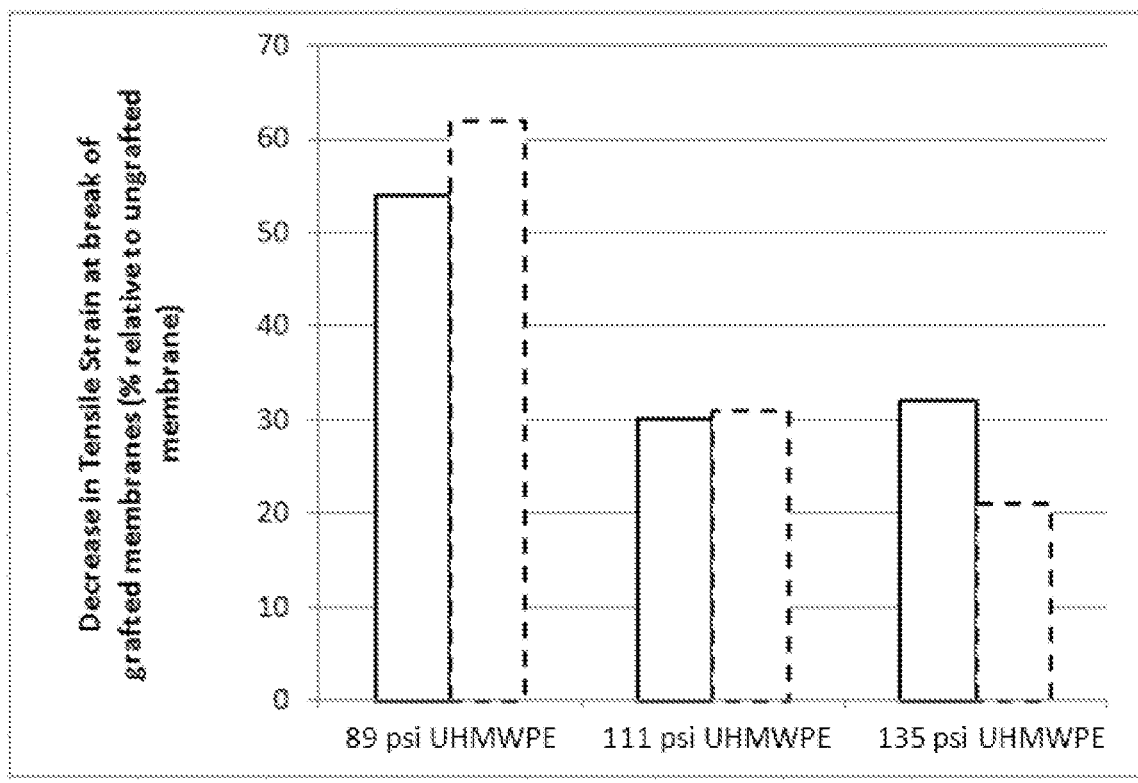
FIG. 12 shows percent decreases in tensile strain and break data for grafted membranes compared to ungrafted membranes.

FIG. 12 is tensile strain at break data for grafted UHMWPE membranes modified according to Examples 22 and 23. Bars with continuous and dotted line refer to data from respective machine and cross web directions. The y-axis depicts the percent increase in tensile strain at break for a grafted membrane when compared to the tensile stain at break of an ungrafted membrane.

EXAMPLE 26

This example illustrates ATR-FTIR spectroscopy of membranes.

The amount of grafted monomers on the membrane surfaces was determined by ATR-FTIR ("ATR") spectroscopy in the form of a peak ratio. ATR measurements were performed with a Bruker Tensor 27 FTIR fitted with ATR assembly housing a germanium crystal. All spectra were recorded with 32 scans, at 4 cm-1 resolution. Background was bare crystal. The peak areas at 1666 and/or 1544 cm-1 (corresponding to amide stretches) were obtained using OPUS data collection program and the sum was divided by the total peak area at 2918 and 2850 cm-1 (corresponding to UHMWPE stretches) to obtain the grafted amount of acryl amide monomer on UHMWPE (ultra high molecular weight polyethylene) surface. Using the UHMWPE signal as a convenient internal standard normalizes out differences in absolute absorbance intensities of amide peaks that could result from variation in the level of modification from one membrane disk to the other.

Figure 13:
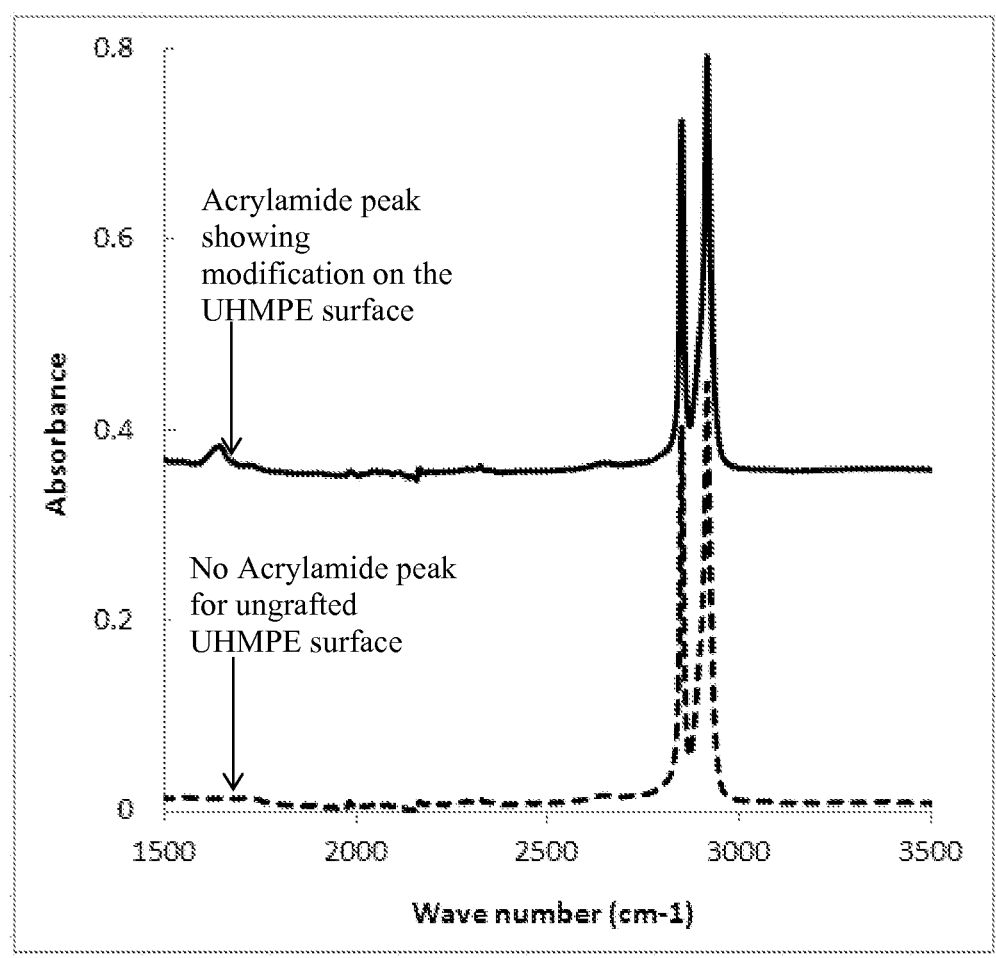
FIG. 13 is an ATR-FTIR spectrum for ungrafted and grafted membranes.

FIG. 13 is an example of IR spectrum using 110 psi membrane before (dotted line) and after grafting (solid line). The after grafting spectrum was offset by 0.2 absorbance units for clarity. The grafted membrane shows a characteristic peak at 1650 cm-1 indicating presence of amide groups.

EXAMPLE 27

This example illustrates a positively charged membrane having 89 psi HFE bubble point prepared with types I and II photoinitiators, and a crosslinker resulting in 59 dyne/cm surface tension.

A 15×30 cm sheet of UHMWPE membrane (89 psi HFE bubble point) was wet in 0.4% benzophenone solution for 25 sec. A grafting solution was made containing 4.5 g dimethylacrylamide (DMAM, 100% in water, Sigma) and 0.53 g of ((3-acrylamidopropyl) trimethylammonium chloride (AP-TAC 75% solution, Sigma) monomers, 0.6 g N,N'-methylenebisacrylamide (MBAM) crosslinker, 7.1 g sodium sulfate, 3 g sodium persulfate and 184.3 g water. After total dissolution of reactants, the grafting solution is placed in a dish and the benzophenone-wetted membrane was introduced into the solution. The dish was covered and the membrane was soaked for 2 minutes. The membrane sheet was removed and placed between 1 mil polyethylene sheets. The excess solution is removed by rolling a rubber roller over the polyethylene/membrane disks/polyethylene sandwich as it lays flat on a table. The polyethylene sandwich is then taped to a transport unit which conveys the assembly through a Fusion Systems broadband UV exposure lab unit emitting at wavelengths from 200 to 600 nm. Time of exposure is controlled by how fast the assembly moves through the UV unit. In this example, the assembly moved through the UV chamber at 9 feet per minute. After emerging from the UV unit, the membrane was removed from the sandwich and immediately placed in DI water, where it was washed by swirling for 5 minutes. Next, it was washed in methanol for 5 minutes. Following this washing procedure the membrane was dried on a holder in an oven operating at 50 C for 10 min. The properties of the resulting membrane are described in Table 5.

TABLE 5

|  | 89 psi membrane (Before/After grafting) |
|---|---|
| IPA flow rate (ml/min) | 7.6/2.74 |
| Surface tension (dynes/cm) | 31/59 |

INCORPORATION BY REFERENCE AND EQUIVALENTS

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A grafted, asymmetric, porous, ultra high molecular weight polyethylene membrane comprising:
   one or more neutral groups or ion exchange groups grafted to one or more surfaces of the membrane; and
   benzophenone adsorbed onto the membrane;
   wherein the membrane has a bubble point between about 78 psi and 160 psi when determined by an ethoxy nonafluorobutane bubble point test;
   wherein the membrane has a water flow rate that is at least 50% of the water flow rate of an ungrafted, asymmetric, porous ultra high molecular weight polyethylene membrane having a bubble point determined by an ethoxy nonafluorobutane bubble point test that is between about 78 psi and about 160 psi; and
   wherein the membrane wets in water in 10 seconds or less.

2. The membrane of claim 1, wherein the ion exchange groups are derived from the group consisting of (3-acrylamidopropyl)trimethylammonium chloride, (vinyl benzyl) trimethyl-ammonium chloride, and combinations thereof.

3. The membrane of claim 1, wherein the ion exchange groups are derived from the group consisting of acrylic acid, vinyl sulfonic acid, and combinations thereof.

4. The membrane of claim 1, wherein the grafted, asymmetric, porous, ultra high molecular weight polyethylene membrane has a surface tension that is between about 60% to 75% higher than the surface tension of an ungrafted, asymmetric, porous ultra high molecular weight polyethylene membrane having a bubble point determined by the ethoxy nonafluorobutane bubble point test that is between about 78 psi and about 160 psi when determined by an ethoxy nonafluorobutane bubble point test.

5. The membrane of claim 1, wherein the neutral groups are derived from the group consisting of N-(hydroxymethyl) acrylamide, 2-hydroxyethylacrylate, and combinations thereof.

6. The membrane of claim 1, wherein the ion exchange groups are derived from a cationic monomer selected from the group consisting of 2-(dimethylamino)ethyl hydrochloride acrylate, [2-(acryloyloxy)ethyl]trimethylammonium chloride, 2 aminoethyl methacrylate hydrochloride, N-(3-aminopropyl) methacrylate hydrochloride, 2 (dimethylamino)ethyl methacrylate hydrochloride, [3- (methacryloylamino)propyl]trimethylammonium chloride solution, [2 (methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-Aminopropyl)-methacrylamide hydrochloride, diallyldimethylammonium chloride, allylamine hydrochloride, vinyl imidazolium hydrochloride, vinyl pyridinium hydrochloride and vinyl benzyl trimethyl ammonium chloride.

7. The membrane of claim 1, wherein the ion exchange groups are derived from an anionic monomers is selected from the group consisting of 2-ethylacrylic acid, acrylic acid, 2-carboxyethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, 3-sulfopropyl methacrylate potassium salt, 2- acrylamido-2-methyl-l-propanesulfonic acid, 3-methacrylamido phenyl boronic acid, vinyl sulfonic acid and vinyl phosphonic acid.

8. The membrane of claim 1, wherein the grafted, asymmetric, porous, ultra high molecular weight polyethylene membrane has a water flow rate that is at least 75% of the water flow rate of an ungrafted, asymmetric, porous ultra high molecular weight polyethylene membrane having a bubble point determined by the ethoxy nonafluorobutane bubble point test that is between about 78 psi and about 160 psi.

9. A grafted, crosslinked, asymmetric, porous, ultra high molecular weight polyethylene membrane comprising:
   one or more neutral groups or ion exchange groups grafted to one or more surfaces of the membrane, wherein the one or more neutral groups or ion exchange groups are crosslinked with a crosslinker; and
   benzophenone adsorbed onto the membrane;
   wherein the membrane has a bubble point between about 78 psi and 160 psi when determined by an ethoxy nonafluorobutane bubble point test;

wherein the membrane has a water flow rate that is at least 50% of the water flow rate of an ungrafted, asymmetric, porous ultra high molecular weight polyethylene membrane having a bubble point determined by the ethoxy nonafluorobutane bubble point test that is between about 78 psi and about 160 psi;

wherein the membrane wets in water in 10 seconds or less; and wherein the membrane has a surface tension between 70 dyne/cm and 72 dynes/cm.

10. A method of making a grafted, asymmetric, porous ultra high molecular weight polyethylene membrane of claim 1, comprising:
   a) contacting an asymmetric, ultra high molecular weight polyethylene membrane with an alcohol solution comprising benzophenone;
   b) contacting the polyethylene membrane with an aqueous exchange solution;
   c) contacting the membrane with an aqueous grafting solution comprising:
      i) one or more of an anionic monomer, cationic monomer, and neutral monomer; and
      ii) one or more of sodium sulfate and sodium persulfate;
   d) exposing the membrane to ultraviolet electromagnetic radiation, thereby resulting in a grafted, asymmetric, porous ultra high molecular weight polyethylene membrane.

11. The method of claim 10, wherein the neutral monomer is N-(hydroxymethyl)acrylamide.

12. The method of claim 10, wherein the neutral monomer is 2-hydroxyethylacrylate.

13. The method of claim 10, wherein the cationic monomer is (3-acrylamidopropyl) trimethylammonium chloride.

14. The method of claim 10, wherein the cationic monomer is (vinylbenzyl) trimethylammonium chloride.

15. The method of claim 10, wherein the anionic monomer is acrylamidopropyl sulfonic acid.

16. The method of claim 10, wherein the cationic monomer is selected from the group consisting of 2-(dimethylamino)ethyl hydrochloride acrylate, [2-(acryloyloxy)-ethyl] trimethylammonium chloride, 2 aminoethyl methacrylate hydrochloride, N-(3-aminopropyl) methacrylate hydrochloride, 2 (dimethylamino)ethyl methacrylate hydrochloride, [3-(methacryloylamino)propyl]trimethylammonium chloride solution, [2 (methacryloyloxy)ethyl]trimethylammonium chloride, acrylamidopropyl trimethylammonium chloride, 2-aminoethyl methacrylamide hydrochloride, N-(2-aminoethyl) methacrylamide hydrochloride, N-(3-Aminopropyl)-methacrylamide hydrochloride, diallyldimethylammonium chloride, allylamine hydrochloride, vinyl imidazolium hydrochloride, vinyl pyridinium hydrochloride and vinyl benzyl trimethyl ammonium chloride.

17. The method of claim 10, wherein the anionic monomers is selected from the group consisting of 2 ethylacrylic acid, acrylic acid, 2-carboxyethyl acrylate, 3-sulfopropyl acrylate potassium salt, 2-propyl acrylic acid, 2-(trifluoromethyl)acrylic acid, methacrylic acid, 2-methyl-2-propene-1-sulfonic acid sodium salt, mono-2-(methacryloyloxy)ethyl maleate, 3-sulfopropyl methacrylate potassium salt, 2-acrylamido-2-methyl-1-propanesulfonic acid, 3 methacrylamido phenyl boronic acid, vinyl sulfonic acid and vinyl phosphonic acid.

18. The method of claim 10, wherein the aqueous grafting solution further comprises a crosslinker.

19. The method of claim 10, wherein the grafting solution comprises one or more of (3 acrylamidopropyl)trimethylammonium chloride, N-(hydroxymethyl)acrylamide), and (vinylbenzyl)trimethylammonium chloride.

20. The method of claim 10, wherein the aqueous exchange solution comprises one or more of sodium sulfate and sodium persulfate.

* * * * *